US012020201B2

(12) United States Patent
Rudeegraap et al.

(10) Patent No.: US 12,020,201 B2
(45) Date of Patent: Jun. 25, 2024

(54) GIFT SENDING PLATFORM FOR BUSINESS CONTACTS

(71) Applicant: Sender, Inc., San Francisco, CA (US)

(72) Inventors: Kris Rudeegraap, San Francisco, CA (US); Michelle Palleschi, San Francisco, CA (US); Qaseem Shaikh, San Francisco, CA (US); Hetal Giaimo, San Francisco, CA (US)

(73) Assignee: Sender, Inc., San Francisco, CA (US)

( * ) Notice: Subject to any disclaimer, the term of this patent is extended or adjusted under 35 U.S.C. 154(b) by 407 days.

(21) Appl. No.: 17/385,715

(22) Filed: Jul. 26, 2021

(65) Prior Publication Data

US 2022/0198386 A1 Jun. 23, 2022

Related U.S. Application Data

(63) Continuation of application No. 17/129,546, filed on Dec. 21, 2020, now Pat. No. 11,074,543.

(51) Int. Cl.
*G06Q 30/00* (2023.01)
*G06Q 10/083* (2023.01)
(Continued)

(52) U.S. Cl.
CPC ....... *G06Q 10/0833* (2013.01); *G06Q 10/083* (2013.01); *G06Q 30/01* (2013.01);
(Continued)

(58) Field of Classification Search
CPC .............................................. G06Q 30/06–08
See application file for complete search history.

(56) References Cited

U.S. PATENT DOCUMENTS 11,093,983 B1* 8/2021 Abrahamson .... G06Q 10/06316
2002/0059122 A1 5/2002 Inoue et al.
(Continued)

FOREIGN PATENT DOCUMENTS

WO 2009/109949 A1 9/2009

OTHER PUBLICATIONS

USPS.com, "USPS Package Intercept", ScreenGrab via WebArchive dated Apr. 27, 2017, available at: https://web.archive.org/web/20170427012940/https://retail-pi.usps.com/retailpi/actions/index.action (Year: 2017).
(Continued)

*Primary Examiner* — Ethan D Civan
(74) *Attorney, Agent, or Firm* — McDermott Will & Emery LLP

(57) ABSTRACT

A method including receiving, in a server, a selection of a first recipient from a group of contacts in a database for a package from a user, is provided. The method includes scheduling a delivery of the package to a first mailing address, providing a code configured to be scanned by a second recipient to indicate that the first recipient is not available at the first mailing address, and triggering a first notification to be sent to the first recipient when the code is scanned. The method includes receiving, from a first client device associated with the first recipient, a second mailing address of the first recipient in response to the first notification, and scheduling a pickup of the package to be shipped to the second mailing address. A system and a non-transitory, computer-readable medium storing instructions to perform the above method are also included.

20 Claims, 39 Drawing Sheets

(51) Int. Cl.
*G06Q 10/0833* (2023.01)
*G06Q 30/01* (2023.01)
*G06Q 30/0201* (2023.01)
*G06Q 30/0601* (2023.01)
*G06Q 40/06* (2012.01)
*G06Q 40/12* (2023.01)

(52) U.S. Cl.
CPC ..... *G06Q 30/0201* (2013.01); *G06Q 30/0637* (2013.01); *G06Q 40/06* (2013.01); *G06Q 40/12* (2013.12)

(56) References Cited

U.S. PATENT DOCUMENTS

| | | |
|---|---|---|
| 2004/0254859 A1 | 12/2004 | Aslanian, Jr. |
| 2008/0004983 A1 | 1/2008 | Cohn |
| 2010/0057556 A1 | 3/2010 | Rousso et al. |
| 2010/0217635 A1 | 8/2010 | Spears |
| 2010/0324959 A1 | 12/2010 | Templeton et al. |
| 2012/0023544 A1 | 1/2012 | Li et al. |
| 2013/0041952 A1 | 2/2013 | Silas et al. |
| 2013/0151381 A1 | 6/2013 | Klein |
| 2013/0290212 A1 | 10/2013 | Park |
| 2013/0346302 A1 | 12/2013 | Purves |
| 2014/0046784 A1* | 2/2014 | Prakash ............... G06Q 20/36 705/17 |
| 2014/0222711 A1 | 8/2014 | Tibbs et al. |
| 2014/0279281 A1 | 9/2014 | Tolcher |
| 2015/0081473 A1* | 3/2015 | Ng .................... G06Q 30/0631 705/26.7 |
| 2015/0088781 A1 | 3/2015 | Gillen et al. |
| 2015/0120602 A1 | 4/2015 | Huffman et al. |
| 2015/0199703 A1 | 7/2015 | Pfeffer et al. |
| 2015/0221021 A1 | 8/2015 | Shakes et al. |
| 2016/0071114 A1 | 3/2016 | Gerdisch et al. |
| 2016/0140632 A1 | 5/2016 | Kandala |
| 2016/0210602 A1 | 7/2016 | Siddique |
| 2016/0314451 A1 | 10/2016 | Martin |
| 2017/0116569 A1 | 4/2017 | Cloud |
| 2018/0089526 A1 | 3/2018 | Walsh |
| 2018/0174093 A1 | 6/2018 | Perez |
| 2020/0034914 A1 | 1/2020 | Boss et al. |

OTHER PUBLICATIONS

Preinterview first office action issued in corresponding U.S. Appl. No. 17/129,546.
First action interview—office action issued in corresponding U.S. Appl. No. 17/129,546.
Notice of Allowance issued in corresponding U.S. Appl. No. 17/129,546.
Office Action issued in corresponding U.S. Appl. No. 17/385,654 dated Sep. 23, 2022.
Office Action issued in corresponding U.S. Appl. No. 17/385,696 dated Sep. 15, 2022.

* cited by examiner

FIG. 5A

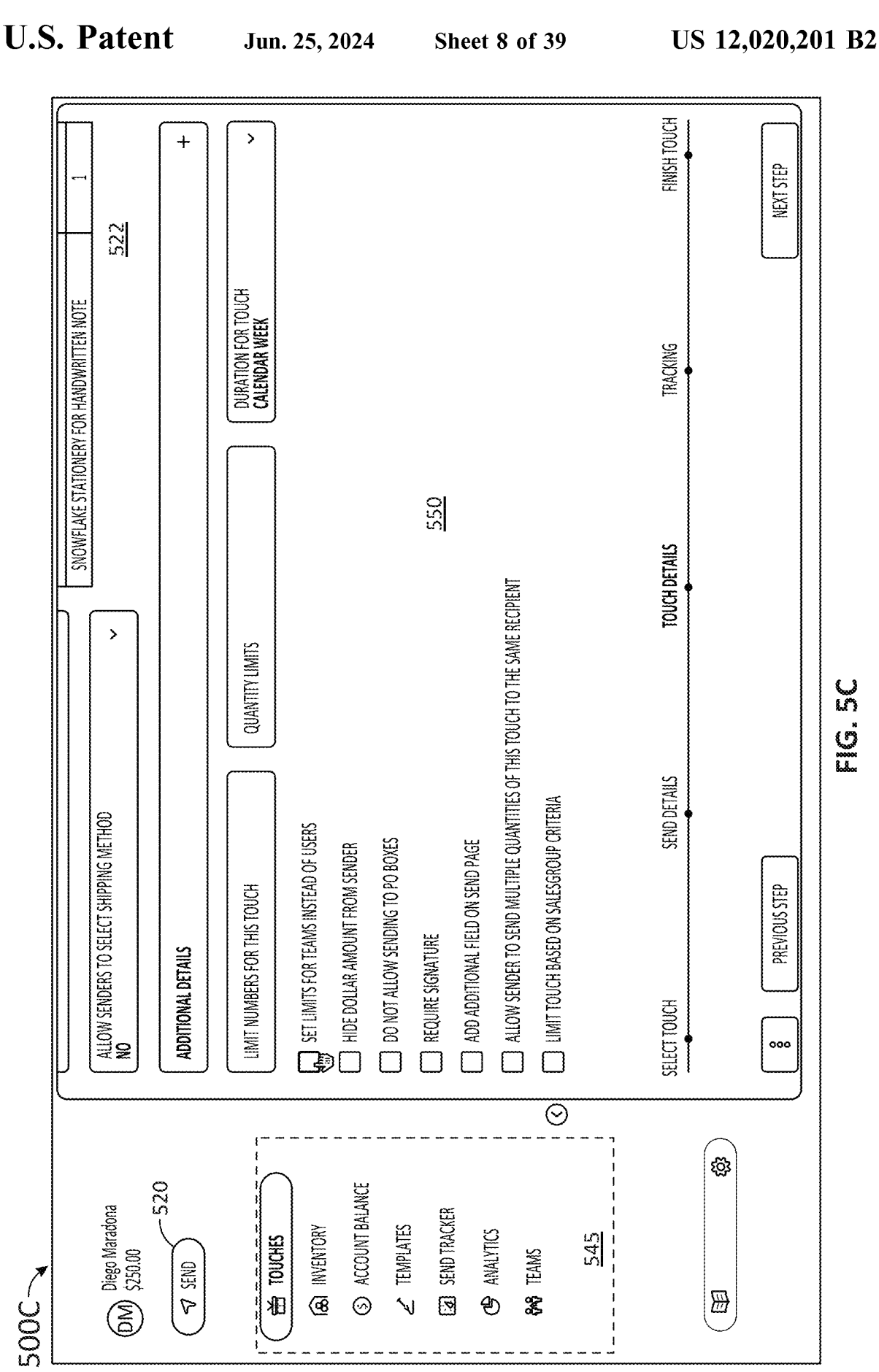

MEETING SCHEDULER ANALYTICS

MEETING SCHEDULER STATS

| CONVERSION RATE | TOTAL MEETING SENDS | TOTAL MEETINGS SCHEDULED | TOTAL GIFTS REDEEMED | EXPIRED URLs |
|---|---|---|---|---|
| 10% (730-1) | 254 (730-2) | 26 (730-3) | 13 (730-4) | 103 (730-5) |

TOP SCHEDULERS
- CODY FARMER — PRODUCT MANAGERS — 9 MEETINGS
- PAIGE JACKSON — ACCOUNT EXECUTIVES — 3 MEETINGS

_722_

SENDER STATS

| NAME | TEAM | SENT | SCHEDULED | CONVERSION RATE | TOTAL SPENT | MOST USED TOUCH |
|---|---|---|---|---|---|---|
| WILLIAM BROWN | ACCOUNT MANAGERS | 3 | 0 | 0% | $28.09 (735-1) | STAGE 1/2/3: AE CANADA RUBICON EGIFT ($5-50) |
| MARY MILLER | ACCOUNT EXECUTIVES | 1 | 0 | 0% | $25 (735-2) | WFH-02-0300-VIRTUAL-CARE-PACKAGE-RUBICON-EGIFT |
| DAVID WHITE | ACCOUNT EXECUTIVES | 5 | 1 | 20% | $40 (735-3) | STAGE 2/3: AE COFFEE |
| MARK ANDERSON | ACCOUNT EXECUTIVES | 4 | 0 | 0% | $40 (735-4) | WFH-02-0300-LUNCH-ON-US-CHOICE-$15 |
| SARAH DAVIS | CSMS | 1 | 1 | 100% | $10 (735-5) | WFH-03-0500-COFFEE-EGIFT-$5-$25 |

Diego Maradona $250.00

SEND

- TOUCHES
- INVENTORY
- ACCOUNT BALANCE
- TEMPLATES
- SEND TRACKER
- ANALYTICS
- TEAMS

_745_

ALL TOUCHES | ALL TEAMS | ALL TIME

CRM ENG

DM Diego Maradona
$250.00

▽ SEND

🔲 TOUCHES
🏛 INVENTORY
💲 ACCOUNT BALANCE
✎ TEMPLATES
📋 SEND TRACKER
📊 ANALYTICS
👥 TEAMS

945

⚙

ALL SENDS ∨

922

(ALL STATUSES) (ALL TEAMS) 930-2 (ALL TOUCHES) 930-3 (ALL TIME) 930-4
930-1

🔍  ⬇ CSV  |  ITEMS UNDELIVERED!

ALL SENDS

| TOUCH NAME ◇ | SENDER NAME ◇ | RECIPIENT NAME ◇ | RECIPIENT EMAIL ◇ | SEND TYPE ◇ | CURRENT STATUS | TRACKING DETAILS |
|---|---|---|---|---|---|---|
| STAGE 1-3-SD R/AE COFFEE | LISA LEWIS | | LISA@CRMENG.COM | EGIFT SENDS | OPENED MON NOV 09 2020 | 945-5 |
| EG-2020-05-WI N-LOSS-SURVE-... | KAREN HARRIS | | KAREN@RMENG.COM | EGIFT SENDS | USED MON NOV 09 2020 | 945-6 |
| WFH-03-0SOC- ART-OF-SUCCUL-... | DONALD KING | ★ SANDRA ADAMS.. | SANDRA@MENG.COM | CRM ENGINE DIRECT SENDS | CONFIRMING ADDRESS MON NOV 09 2020 | 945-7 |
| WFH-01-0280- WINE-BOTTLE-C-... | EMILY HILL | CAROL BAKER | CAROL@MENG.COM | CRM ENGINE DIRECT SENDS | CONFIRMING ADDRESS MON NOV 09 2020 | 945-8 |
| STAGE 1-3-SD R/AE COFFEE | MELISSA RIVERA | | MELISA@MENG.COM | EGIFT SENDS | SENT MON NOV 09 2020 | 945-9 |
| STAGE 1-3-SD R/AE COFFEE | SHARON CARTER | | SHARON@MENG.COM | EGIFT SENDS | SENT MON NOV 09 2020 | 945-10 |
| WFH-02-0300-... | LAURA ROBERTS | JASON BAKER | JASON@MENG.COM | CRM ENGINE DIRECT SENDS | CONFIRMING ADDRESS | 945-11 |

INVENTORY

WHAT TYPE OF PRODUCT WOULD YOU LIKE TO CREATE?

1130-1
PRINTED NOTECARDS OR LETTERHEADS
USE OUR HIGH END PRINTER TO CREATE YOUR OWN CUSTOM NOTE CARDS, TEMPLATES OR LETTER HEADS TO INCLUDE IN YOUR TOUCHES

1130-2
PHYSICAL PRODUCTS
ADD YOUR PRODUCT TO OUR WAREHOUSE! HAVE OUR TEAM DO THE HEAVY LIFTING TO GET YOUR ITEMS TO THE WAREHOUSE AND START USING THEM IN YOUR TOUCHES!

1122

SELECT PRODUCT TYPE — CONFIGURE YOUR PAGE — CREATE YOUR OWN PRODUCT

[BACK]  [NEXT]

Diego Maradona
$250.00

[SEND]

- TOUCHES
- INVENTORY
- ACCOUNT BALANCE
- TEMPLATES
- SEND TRACKER
- ANALYTICS
- TEAMS

GIFT SENDING PLATFORM FOR BUSINESS CONTACTS

CROSS-REFERENCE TO RELATED APPLICATIONS

This application claims priority under 35 U.S.C. § 120 as a continuation of U.S. patent application Ser. No. 17/129,546 filed Dec. 21, 2020, to Kris Rudeegraap, et al. entitled "GIFT SENDING PLATFORM FOR BUSINESS CONTACTS," the contents of which are hereinafter incorporated by reference in their entirety, for all purposes.

BACKGROUND

Field

The present disclosure generally relates to a platform for management of client relations within an organization having a vast network of current and potential customers. More specifically, the present disclosure relates to a platform for selecting and sending gift packages to identified targets in a customer network, for tracking the gift package and accurately evaluating the impact for the organization in terms of revenue from accrued business.

Description of the Related Art

Currently, systems for managing customer relations in an organization involve ad-hoc, piecemeal strategies that are cumbersome and time-consuming to handle. Moreover, most systems lack the ability to efficiently track and evaluate customer reach out in a manner that may be beneficial for future efforts. In addition, current systems offer parcel services that are incompatible with current networking, online purchasing of merchandise, and package delivery platforms.

SUMMARY

In one embodiment of the present disclosure, a computer-implemented method is described that includes receiving, in a server, a selection of a first recipient for a package from a user, the first recipient selected from a group of contacts in a database. The computer-implemented method also includes scheduling a delivery of the package including at least one item selected by the user, to a first mailing address, providing, for display with the package, a code configured to be scanned by a second recipient to indicate that the first recipient is not available at the first mailing address, and receiving an indication that the code has been scanned. The computer-implemented method also includes triggering a first notification to be sent to the first recipient when the code is scanned, receiving, from a first client device associated with the first recipient, a second mailing address of the first recipient in response to the first notification, providing, to a second client device with the second recipient, a second notification including an indication to obtain a shipping label including the second mailing address of the first recipient, and scheduling a pickup of the package to be shipped to the second mailing address.

According to one embodiment, a system is described that includes one or more processors and a memory coupled to the one or more processors, the memory including instructions that, when executed by the one or more processors, cause the system to receive, in a server, a selection of a first recipient for a package from a user, the first recipient selected from a group of contacts in a database. The one or more processors also execute instructions to schedule a delivery of the package including at least one item selected by the user, to a first mailing address, to provide, for display with the package, a code configured to be scanned by a second recipient to indicate that the first recipient is not available at the first mailing address, and to receive an indication that the code has been scanned. The one or more processors also execute instructions to trigger a first notification to be sent to the first recipient when the code is scanned, to receive, from a first client device associated with the first recipient, a second mailing address of the first recipient in response to the first notification, and to provide, to a second client device with the second recipient, a second notification including an indication to obtain a shipping label including the second mailing address of the first recipient. The one or more processors also execute instructions to schedule a pickup of the package to be shipped to the second mailing address, and to include, in the first notification, a link to a web page configured to receive the second mailing address from the first recipient.

In one embodiment, a non-transitory, computer readable medium storing instructions which, when executed by a processor, cause a computer to perform a method, including receiving, in a server, a selection of a first recipient for a package from a user, the first recipient selected from a group of contacts in a database. The method also includes scheduling a delivery of the package including at least one item selected by the user, to a first mailing address, providing, for display with the package, a code configured to be scanned by a second recipient to indicate that the first recipient is not available at the first mailing address, and receiving an indication that the code has been scanned. The method also includes triggering a first notification to be sent to the first recipient when the code is scanned, receiving, from a first client device associated with the first recipient, a second mailing address of the first recipient in response to the first notification, and providing, to a second client device with the second recipient, a second notification including an indication to obtain a shipping label including the second mailing address of the first recipient. The method also includes scheduling a pickup of the package to be shipped to the second mailing address and including, in the first notification, a link to a web page configured to receive the second mailing address from the first recipient, wherein-the second notification triggers a printing, on a printing device coupled to the second client device, of a new shipping label with the second mailing address of the first recipient.

According to one embodiment, a computer-implemented method is provided that includes identifying, upon request by a user, a network activity of a recipient selected by the user and tracking an interest for an item for the recipient based on the network activity. The computer-implemented method also includes selecting, from a network resource, a new product to add as an item to an inventory, wherein the network resource includes an online search engine, setting an auto re-ordering instruction for the item when an inventory count is below a pre-selected threshold, and tracking the inventory across multiple warehouses and locations to update the inventory count. The computer-implemented method also includes collecting an image and a video of the item in at least one of the warehouses, providing at least one of the image or the video of the item to a user, wherein the user has selected to include the item in a gift package for a recipient, and providing a ship instruction to retrieve the item from the warehouse when the item is included in the gift package by the user.

In yet another embodiment, a system is described that includes a means for storing commands and a means for executing the commands causing the system to perform a method including receiving, in a server, a selection of a first recipient for a package from a user, the first recipient selected from a group of contacts in a database. The method also includes scheduling a delivery of the package including at least one item selected by the user, to a first mailing address, providing, for display with the package, a code configured to be scanned by a second recipient to indicate that the first recipient is not available at the first mailing address, and receiving an indication that the code has been scanned. The method also includes triggering a first notification to be sent to the first recipient when the code is scanned, receiving, from a first client device associated with the first recipient, a second mailing address of the first recipient in response to the first notification, providing, to a second client device with the second recipient, a second notification including an indication to obtain a shipping label including the second mailing address of the first recipient, and scheduling a pickup of the package to be shipped to the second mailing address.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIGS. 5A-5G illustrate screenshots for a gift preparation console in an application hosted by a client relations management engine, as disclosed herein.

FIGS. 7A-7B illustrate screenshots in an application hosted by a client relations management engine, according to some embodiments.

FIGS. 9A-9E illustrate screenshots in an application hosted by a client relations management engine, according to some embodiments.

FIGS. 10A-10C illustrate screenshots in an application hosted by a client relations management engine, according to some embodiments.

FIGS. 11A-11B illustrate screenshots in an application hosted by a client relations management engine, according to some embodiments.

In the figures, elements and steps denoted by the same or similar reference numerals are associated with the same or similar elements and steps, unless indicated otherwise.

DETAILED DESCRIPTION

Figure 1:
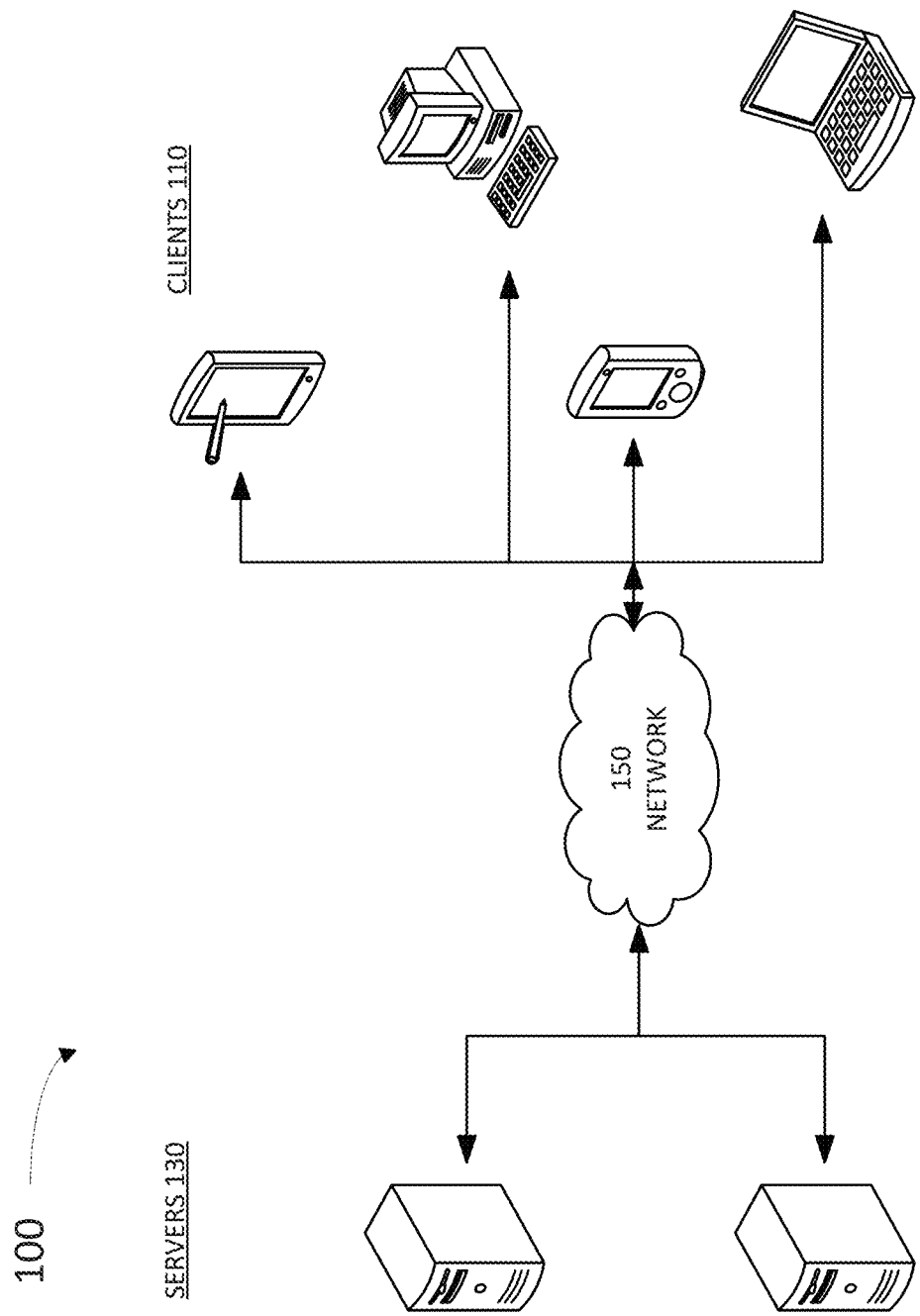
FIG. 1 illustrates an example architecture suitable to provide a platform for a client relations management engine, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

With the availability of multiple resources for online shopping, social networking, and access to smart package delivery services, there is an untapped opportunity to provide a gift package delivery service for professional networks of individuals. Current professional network services lack the ability to send gift packages amongst members in the context of a business relationship that can be budgeted, tracked, and evaluated in terms of concrete results.

A problem that arises in the realm of social networking through client computer devices, especially for enterprise networking, is the lack of a unified system where a user can select a gift recipient from a comprehensive network, and form, send, and track the gift package even after delivery. Also lacking, is the ability to perform follow-up actions after the gift package delivery, such as schedule meetings with the gift recipient, and track further activity on the part of the gift recipient enterprise in relation to the user enterprise.

The disclosed system addresses the above problem specifically arising in the realm of computer technology by providing a solution also rooted in computer technology, namely, by providing a client relations management engine including an inventory tool, a networking tool, a logistics tool, and a package delivery tool, wherein the above tasks are centralized within a single host for an application installed in a client device handled by a user.

In some embodiments, the client relations management engine includes a scheduling tool to enable the user to schedule a meeting with a gift recipient prior to, or after a gift package delivery. Moreover, the logistics tool may be configured to suggest the user a list of items to include in the gift package based on a history log indicating recommended items based on digital attributes of the user and the gift recipient. In some embodiments, the client relations management engine is configured to send group gift options via a virtual conferencing software in real-time with one or more recipients that vote on the gifts and the most popular gift is then sent to the one or more recipients. In some embodiments, a client relations management engine as disclosed herein may provide a physical credit card that combines offline and online gift giving and tracks the budgets, recipients, gifts, and results in a single interface. In some embodiments, a client relations management engine may include a feature to request a gift recipient to confirm a calendar meeting on the sender's calendar before getting access to the gift. In some embodiments, a client relations management engine as disclosed herein sends an electronic message to a gift recipient to confirm a physical mailing address before delivery of a gift package. In some embodiments, a client relations management engine as disclosed herein includes a feature to allow an office person to scan a barcode or enter a short universal resource locator (URL) which sends an electronic message asking whether the recipient prefers to keep the package in the office or redeliver it to their home address.

Example System Architecture

FIG. 1 illustrates an example architecture 100 suitable to provide a platform for management of client relations, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host an application in client device 110 with which a user may select and send a gift package to a gift recipient. Further, in some embodiments, the processor in server 130 is configured to provide to the user selections of items to include in the gift package, through client device 110. In some embodiments, the user selections may include services provided by a third party server 130 through network 150. Servers 130 can include a package delivery server that coordinates package receipt and delivery for users through online request and scheduling via network 150. For purposes of load balancing, multiple servers 130 can host memories including instructions to one or more processors and multiple servers 130 for hosting one or more meetings as disclosed herein.

Servers 130 may include any device having an appropriate processor, memory, and communications capability for hosting the documents and applications associated with a client relations management engine. The client relations management engine may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing tools and resources on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
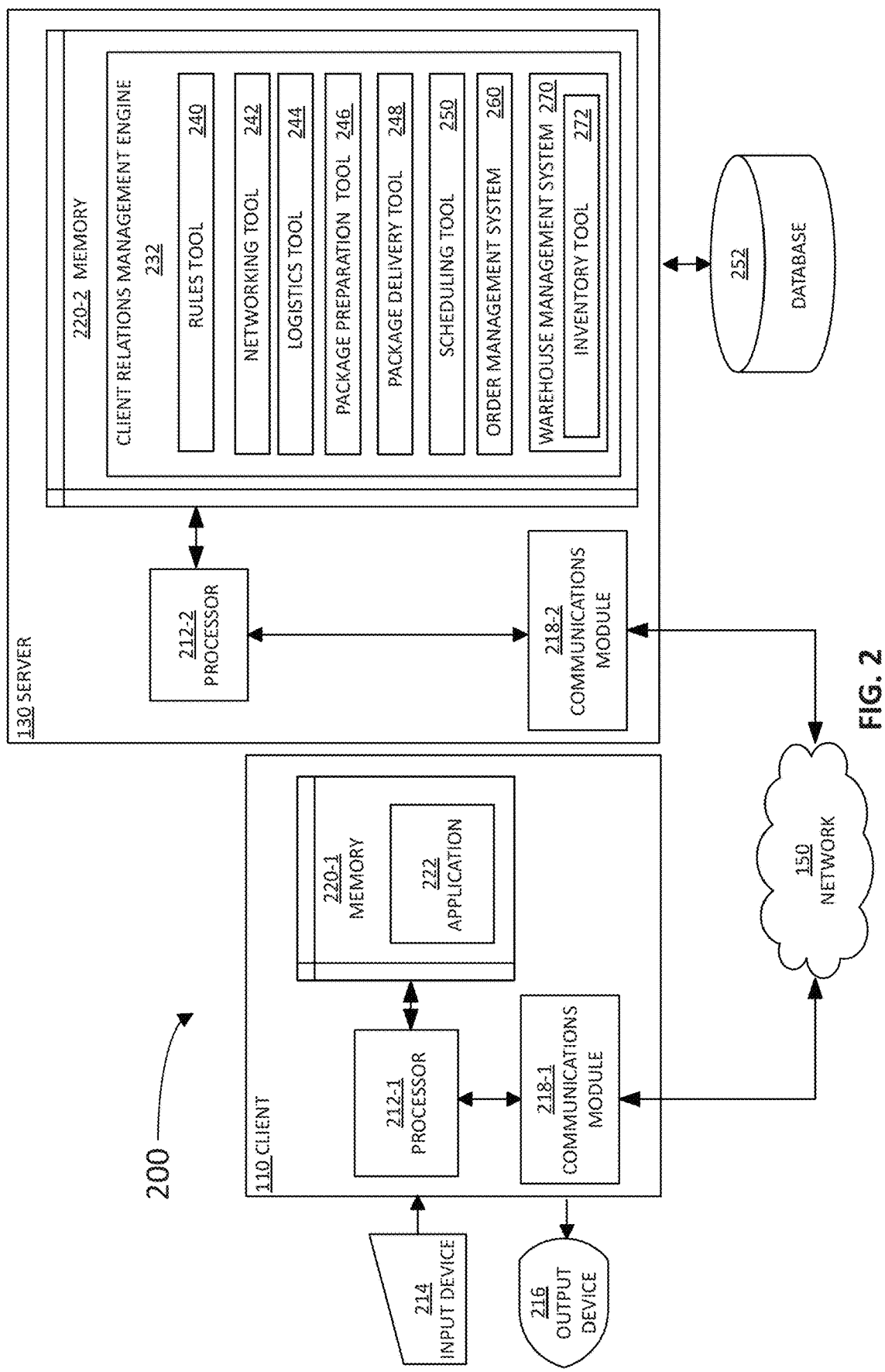
FIG. 2 is a block diagram illustrating an example server and client from the architecture of FIG. 1, according to certain aspects of the disclosure.

FIG. 2 is a block diagram 200 illustrating an example server 130 and client device 110 in architecture 100, according to certain aspects of the disclosure. Client device 110 and server 130 are communicatively coupled over network 150 via communications modules 218-1 and 218-2 (hereinafter, collectively referred to as "communications modules 218"), respectively. Communications modules 218 are configured to interface with network 150 to send and receive information, such as data, requests, responses, and commands to other devices on the network. Communications modules 218 can be, for example, modems or Ethernet cards, and include radio hardware and software, such as radio-frequency (RF) antennas, modulators, de-modulators, analog-to-digital converters, and digital-to-analog converters (DAC).

Client device 110 may be any one of a desktop computer, a laptop, or a mobile computing device. Client device 110 may include a processor 212-1 and a memory 220-1. An input device 214 and an output device 216 enable the user to interact with client device 110. Examples of input device 214 and output device 216 may include a mouse, a keyboard, a display, a touch-interactive display, and the like. In some embodiments, input device 214 may include a camera, a video camera, and a microphone. Accordingly, client device 110 may collect an audio signal, a video signal, or a combination thereof from the user (e.g., in a remote meeting event, for other participants to see and record), and transmit the signal to a server 130 through communications module 218-1.

Server 130 includes a memory 220-2, a processor 212-2, and communications module 218-2. The user interface is displayed for the user in an output device 216 of client device 110. Memory 220-2 includes a client relations management engine (CRM) 232 to enable server 130 to support a network-based gift package selection and delivery by multiple remote users (e.g., users of client devices 110). CRM engine 232 may also include a networking tool 242, a logistics tool 244, a scheduling tool 250, and an inventory tool 272. Server 130 may also be communicatively coupled with a database 252, storing data and information collected from or provided to the multiple users, e.g., in a professional or business network. CRM engine 232 includes instructions which, when executed by processor 212-2, cause server 130 to perform at least partially steps as disclosed herein. For example, CRM engine 232 includes instructions to communicate with application 222 to provide an inventory list of items to include in a gift package to the user of client device 110, as disclosed herein. CRM engine 232 may also include instructions to store a history log and other data related to a gift package as disclosed herein into database 252. Database 252 may also include an inventory with lists of items that users may include in gift packages as disclosed herein. Furthermore, in some embodiments, CRM engine 232 may include instructions to retrieve at least some of the data in database 252 and provide to one or more users to prepare and send a gift package, as disclosed herein. Processors 212-1 and 212-2, and memories 220-1 and 220-2 will be collectively referred to, hereinafter, as "processors 212" and "memories 220," respectively.

In some embodiments, CRM engine 232 stores and maintains for a selected period of time, data in database 252. Further, CRM engine 232 updates different changes and modifications on a document or file, e.g., a digital attribute of a user or of a gift recipient or, as part of a chat/topic history, as stored in database 252. In some embodiments, the activity, notes, and other actions taken by different users regarding items in an inventory for inclusion in a gift package are also included in database 252. A gift recipient may access a meeting hosted by CRM engine 232 through application 222 installed in memory 220-1 of client device 110. The gift recipient may also access the meeting hosted by CRM engine 232 via a web browser installed in client device 110. A processor 212-1 in client device 110 may control execution of application 222. In some embodiments, application 222 is downloaded and installed by the participant into client device 110, from server 130.

Processor 212-2 is configured to execute instructions, such as instructions physically coded into processor 212-2, instructions received from software in memory 220-2, or a combination thereof. A user with client device 110 may select, through input device 214, an item from an inventory (e.g., a digital gift card, a service, or a physical object selected from an e-commerce service) to CRM engine 232 for inclusion in a gift package via a user interface of application 222.

More specifically, CRM engine 232 may include a rules tool 240, a networking tool 242, a logistics tool 244, a package preparation tool 246, a package delivery tool 248, and a scheduling tool 250. In some embodiments, rules and permissions may be set in rules tool 240 by an authorized user via client device 110. In yet other embodiments, rules and permissions may be imported into rules tool 240 from a third party server handling a client relations management network, according to networking tool 242. Rules stored and handled in rules tool 240 may include authorizations for who can send a gift package and to which recipients. The rules in rules tool 240 may also include restrictions as to which budget source to use for a specific gift package, or which third party CRM campaign to track or associate the gift package with, including the start and end date of the CRM campaign. Rules tool 240 may also include input kitting instructions, set sending limits, and determines whether the gift package is a manual one user-to-one recipient or a triggered 1 user-to-many recipients. More generally, rules tool 240 may be configured to establish which users can read, write, edit, and/or delete a desired functionality on the platform supported by CRM engine 232.

Networking tool 242 may include and maintain lists of users, consumers, and potential consumers, including digital attributes, in database 252. In some embodiments, the digital attributes of consumers and other users in database 252 may include name, address, and job title of a potential consumer or client in the network. Further, in some embodiments, the digital attributes of members in networking tool 242 may include a relationship tree or graph associating each member in the network with a direct relationship in the network. The individuals participating in networking tool 242 may be users of CRM engine 232, or may be gift recipients of users of CRM engine 232, or both.

In some embodiments, networking tool 242 is configured as a relationship manager for the user. Accordingly, networking tool 242 may provide a lightweight (e.g., digital) CRM/contact/rolodex for the user. In some embodiments, networking tool 242 may add contacts manually, via CSV upload, or via CRM/MAP rules. Networking tool 242 may also automatically add a recipient as a contact for the user, search for existing contacts on a "Send" page widget during a send flow, track recipient history and see who sent what to whom and when, track recipient birthdate, queue contacts for later research, and enrich contacts with more data automatically. Networking tool 242 may also identify which recipients have setup address confirmation and send again without asking for address, identify which gift types, or send drive results per recipient. In some embodiments, networking tool 242 may also work as an interest tracker tool to track interests for recipients and show a queue of recipients currently getting interests researched, and create tags and groups of contacts. In some embodiments, networking tool 242 includes an interest tracker configured to identify the interests, likes, and dislikes of potential gift recipients. Accordingly, networking tool 242 may be configured to let senders input recipients' interests, hobbies, and the like. In some embodiments, networking tool 242 may display interest tracker data in a widget included in application 222, for the user. Networking tool 242 may allow users to opt-in their contacts for interests tracked across a network of gift recipients, through application 222. Networking tool 242 may also allow the user to set interests to be private to the user, the user team, the user company, or the user network. In some embodiments, networking tool 242 may allow users to opt-in and find recipients' interests via a research tool. Networking tool 242 may also integrate with third party networking tools to pull in interest/hobby keywords from conversations between users and recipients in a CRM network. In some embodiments, networking tool 242 may set interests to expire after a certain date (e.g., a TV show would expire in a few months, or a year, and the like). In some embodiments, networking tool 242 may access a recipient mobile application to find and identify gifting preferences for the recipient. More generally, networking tool 242 may track interests of business professionals and provide suggested gifts to let recipients and/or sender decide which gift they prefer to send or receive.

In some embodiments, networking tool 242 may include a research tool that allows users to research interests and mailing addresses of potential gift recipients. Accordingly, networking tool 242 may use data scraping and an outsource team of people to manually research and review publicly available information about network members. For example, in some embodiments, networking tool 242 works in a one sender to one recipient configuration, or a one sender to a group configuration to build an extensive relational dataset. In some embodiments, networking tool 242 may perform a once in a time search for information, or a recurring search (e.g., every 90 days or so), according to a setting from the user, or an authorized administrator of CRM engine 232. In some embodiments, a user can request networking tool 242 a research on a potential recipient during a package send flow. In a package send flow, a user may request networking tool 242 to research the address of a gift recipient, and then send the package. In some embodiments, the user may research interests of potential gift recipients and then add to a recommended "Send" queue. In some embodiments, the user may research interests using networking tool 242 and then send a choice of several gift packages to the recipient, based on the search results. In some embodiments, networking tool 242 may create in database 252 an extensive relational dataset of interests/hobbies and related gifts via inventory sends, e-Gifts, and other networking services provided by a third party.

Logistics tool 244 may include access to technical settings of application 222 hosted by CRM engine 232. The technical settings may include the budgets and network credentials of the user of client device 110, and a history of prior gift packages prepared and sent by the user, new updates to the user network, and the like.

In some embodiments, logistics tool 244 may handle challenges and leader boards where managers can set up challenges to create competitions among senders. For example, the challenges could be for most meetings booked, most opportunity created, most Cameos sent, most sender success snippets (e.g., gift recipients browsing through company website), streaks of three or more months of sending a given number of sends, and the like. In some embodiments, logistics tool 244 may provide, via application 222, a leader board to show who is winning, and establish prizes via a Swag Store for the winners. In some embodiments, logistics tool 244 may be configured to avoid sending the same gift package to a single recipient more than once, for at least a pre-selected amount of time (a week, a month, a year, and the like). In some embodiments, logistics tool 244 may include a widget in application 222 to engage customers monthly, weekly, or at any other frequency, with an email/WalkMe of new gift packages available through CRM engine 232.

Package preparation tool 246 enables the user of application 222 to select different items to be included in a gift package, for delivery. In some embodiments, package preparation tool 246 is linked to third party online shopping services that prepare lists of items for suggestion to the user. In some embodiments, package preparation tool 246 presents suggestions to the user based on the user attributes, or the gift recipient attributes as provided by networking tool 242.

In some embodiments, package preparation tool 246 may include a "Touch" planner tool that provides users the ability to plan out what they desire to send and suggestions to include in a gift package based on prior history with the sender, the recipient, or in the CRM network in general. In some embodiments, package preparation tool 246 may configure a gift package to be sent via a voice channel. Accordingly, package preparation tool 246 may include a voice assistant to send gifts via voice. With package preparation tool 246, CRM engine 232 provides a contextual gift platform that allows senders to say what they want to send, whom they want to send to, and the custom gift message all with just voice. Package preparation tool 246 may include an "all in price point" which includes sourcing, pick/pack, and shipping in a single budget for the gift package. In addition, package preparation tool 246 may allow the user to select beautiful imagery with gifs, videos, and the like, to include in the gift package.

Package delivery tool 248 is configured to link the user handling application 222 with a package delivery service to schedule a delivery of a gift package to a gift recipient. In some embodiments, package delivery tool 248 may be configured to send packages that get delivered the same day, or within a selected time window.

Scheduling tool 250 provides the ability for the user to schedule a meeting with a gift recipient before, after, or upon receipt of, the gift package. Schedule sends to be shipped or delivered on a specific date. Scheduling tool 250 also provides, for the user, a calendar view of upcoming scheduled sends and a pending inventory to track scheduled inventory. In some embodiments, scheduling tool 250 integrates the CRM engine calendar into third party calendar services or event handlers to account for upcoming sequences or potential triggers which have pending inventory with CRM engine 232. Accordingly, scheduling tool 250 may synchronize gift sending events with a third party calendar provider for the user or for the recipient, and suggest sends for upcoming marketing webinars, events, and the like. In some embodiments, scheduling tool 250 works with networking tool 242 to feature a "set it and forget it" button in a widget for application 222. The button may be used for important dates such as a customer's birthday, promotions, anniversaries, and the like. In some embodiments, scheduling tool 250 provides the ability to schedule a send based on another send status (e.g., movie popcorn delivered triggers a movie ticket e-Gift).

Some embodiments include artificial intelligence software and other nonlinear techniques such as neural networks or machine learning within any one of the tools in CRM engine 232. Moreover, in some embodiments, CRM engine 232 may identify and mark a decision making event in the timeline record. In some embodiments, CRM engine 232 integrates the operations of any one of tools 240, 242, 244, 246, 248, and 250 with a third party server. In that regard, CRM engine 232 may synchronize database 252 with databases and tools in third party servers, and may keep track of any synchronization failures or missing steps (e.g., in a log file) to ensure a continuous update or report any errors to a network manager. In some embodiments, CRM engine 232 may use artificial intelligence (AI) and machine learning (ML) algorithms to prepare and suggest handwritten notes for users with content suggested by data science. Accordingly, CRM engine 232 may combine messaging from sender's website with gift/product attributes to create a unique AI generated message for the user to include in a gift package.

CRM engine 232 may also include an order management system 260 and a warehouse management system 270. Order management system 260 is configured to keep track of different gift packages ('Touches') put together by a user of client device 110, and verify that rules and permissions are satisfied according to rules tool 240. Warehouse management system 270 includes an inventory tool 272. In some embodiments, inventory tool 272 is configured to create, update, and maintain an inventory of items (e.g., electronic items such as digital promotions, offers, and the like, and physical items, like consumer branded goods, utility items, appliances, and the like) in database 252. Accordingly, warehouse management system 270 may be able to determine specific warehouses from which to retrieve the items selected on any given gift package put together by the user via order management system 260. In some embodiments, warehouse management system 270 also provides requests to different warehouses for replenishment of the stocks of certain items that may be running low, according to inventory tool 272.

Inventory tool 272 is configured to add new products, items, and services to a gift inventory. In some embodiments, inventory tool 272 may setup an auto re-ordering schedule of the inventory when an inventory count gets below a pre-selected threshold. Inventory tool 272 tracks inventory across multiple warehouses and countries. In some embodiments, warehouse management system 270 provides for the user, via application 222, images and videos of items in the warehouse, so that the user may select which item from which warehouse to include in a gift package. In some embodiments, warehouse management system 270 creates a ship notice to send items to a specific warehouse (to update the inventory therein).

Figure 3A:
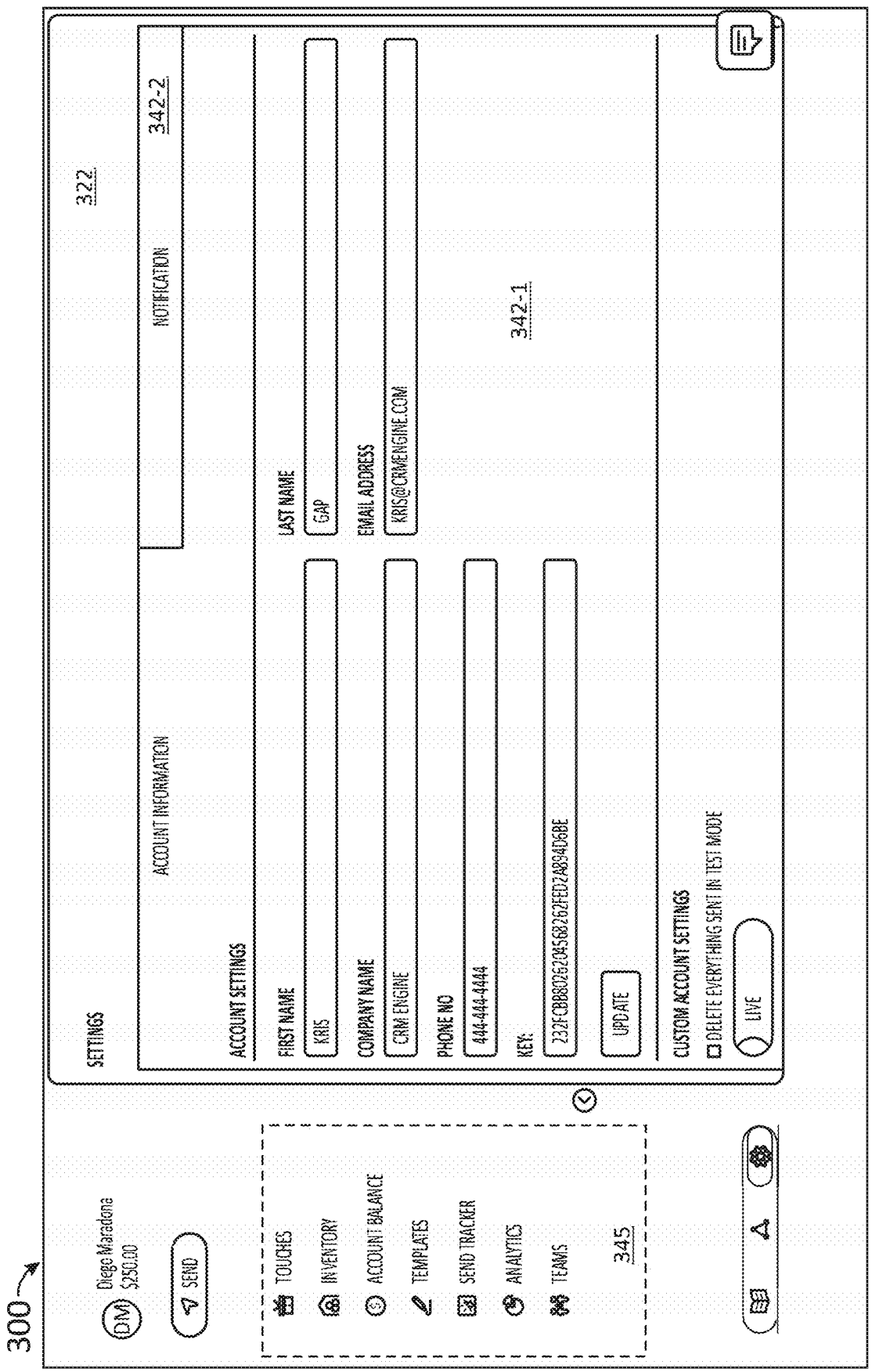
FIGS. 3A-3B illustrate screenshots for a settings console in an application hosted by a client relations management engine, according to some embodiments.
Figure 3B:
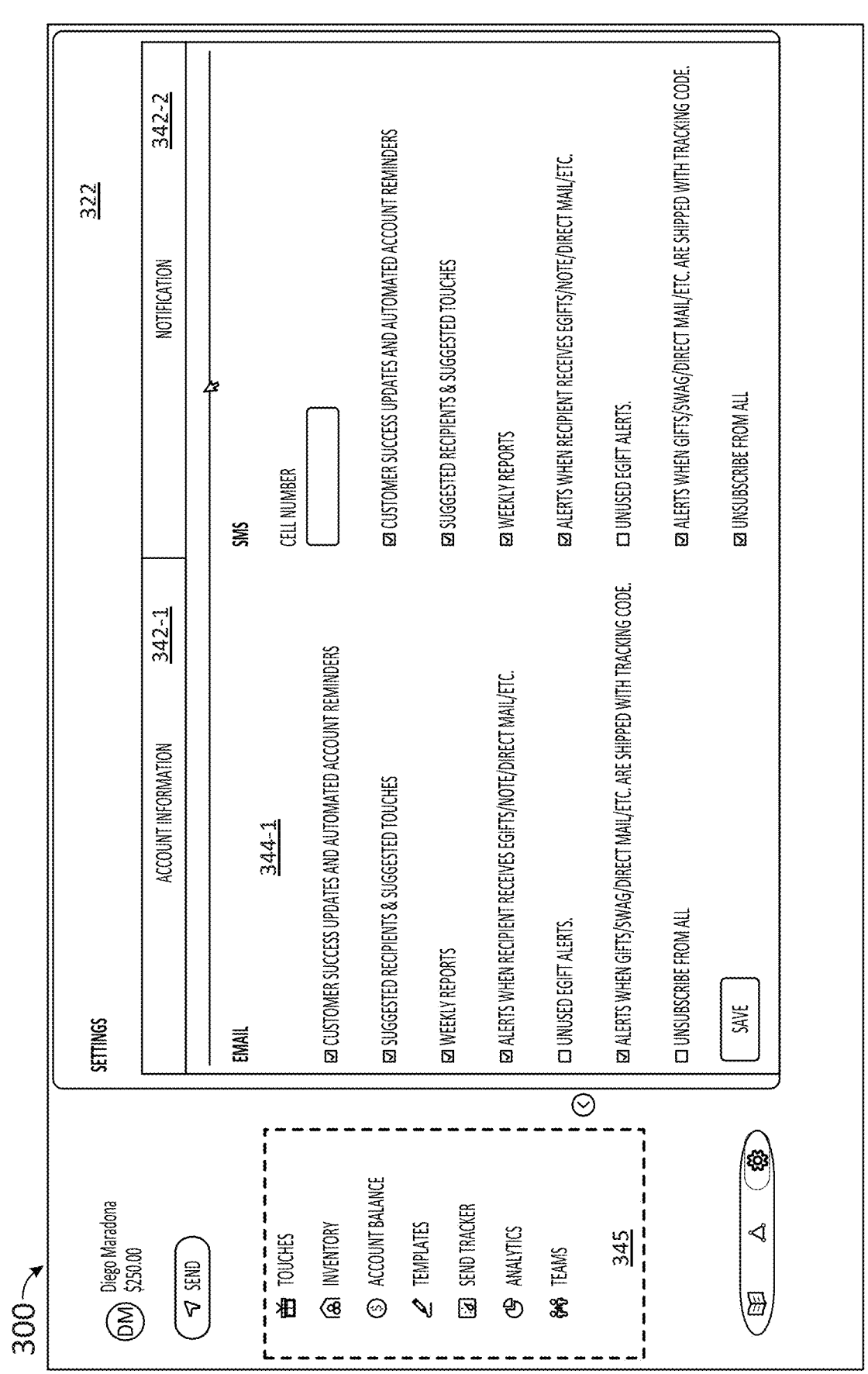

FIGS. 3A-3B illustrate screenshots illustrating settings console 300, in an application 322 hosted by a CRM engine, according to some embodiments. The user runs application 322, which displays a menu field 345 in a client device handled by the user. Menu field 345 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

Settings console 300 includes an account information tab 342-1 and a notifications tab 342-2. Settings console 300 also includes an email configuration field 344-1 in account information tab 342-1.

Figure 4:
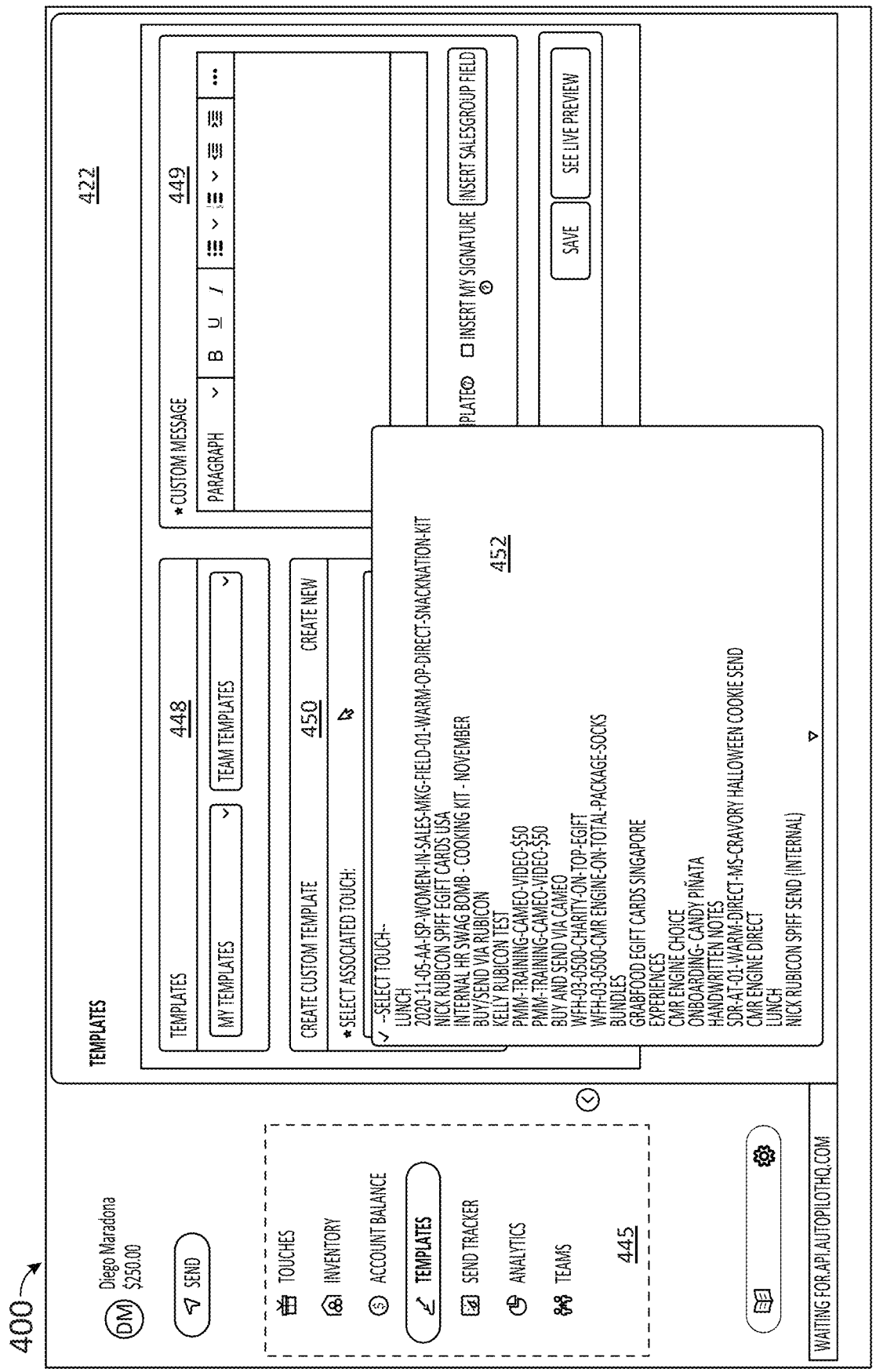
FIG. 4 illustrates a screenshot for a templates console in an application hosted by a client relations management engine, according to some embodiments.

FIG. 4 illustrates a screenshot of a templates console 400, in an application 422 hosted by a CRM engine, according to some embodiments. The user runs application 422, which displays a menu field 445 in a client device handled by the user. Menu field 445 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

Templates console 400 includes a templates tab 448 and a custom message tab 449. Templates console 400 enables the user to create a custom template through a create new tab 450. When the user clicks the create new tab 450, application 422 may display a list 452 of prior "Touches" or gift packages that the user has saved in a history log associated with the user's account.

FIGS. 5A-5G illustrate screenshots 500A, 500B, 500C, 500D, 500E, 500F, and 500G (hereinafter, collectively referred to as "screenshots 500") in an application 522 hosted by a CRM engine, according to some embodiments. The user runs application 522, which displays a menu field 545 in a client device handled by the user. Menu field 545 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

Using screenshots 500, the user selects what they want to send in a gift package based on suggestions filtered for user roles and permissions (e.g., provided by rules tool 240). Application 522 allows the user or an authorized system administrator to setup rules when creating a gift package. In some embodiments, the user may search for gift packages to send according to a listing of previous packages sent in the past, e.g., by other users within an enterprise or network. A send button 520 enables the user to send the gift package to the order management system, which then passes the order to a warehouse management system (e.g., order management system 260 and warehouse management system 270). Application 522 also allows the user to track which gift packages are active, paused per no inventory (e.g., according to inventory tool 272), or archived/completed (e.g., in database 252).

Application 522 may classify the gift packages or the items within each gift package according to different types, such as: inventoried items, custom swag/promotional products, e-Gift cards, handwritten notes, Cameo videos, Vidyard videos, personalized gifts, perishable items, printed on demand collateral, alcohol, virtual experiences, and more. In some embodiments, application 522 allows the user to aggregate multiple (e.g., 10 or even more) types of items such as digital gifts and physical gifts on a single platform, and even a single gift package. In some embodiments, e-Gift cards may be charged to the sender (e.g., the user of application 522) upfront and delivered to the recipient as an offer which expires after a set number of days, and upon expiry the sender receives a refund.

In some embodiments, application 522 may include a showcase screen illustrating monthly pre-created kits or gift packages (~5/month) that may be available in a warehouse. In some embodiments, application 522 may showcase a group of gift packages with limited availability (~500, e.g., based on an inventory or other logistic consideration) shared across one or more users on the CRM network. In some embodiments, application 522 may offer users an on-demand branding option via high end custom stickers on a box and/or items selected for a gift package, or print-on-demand inserts to be included in the gift package.

Figure 5A:
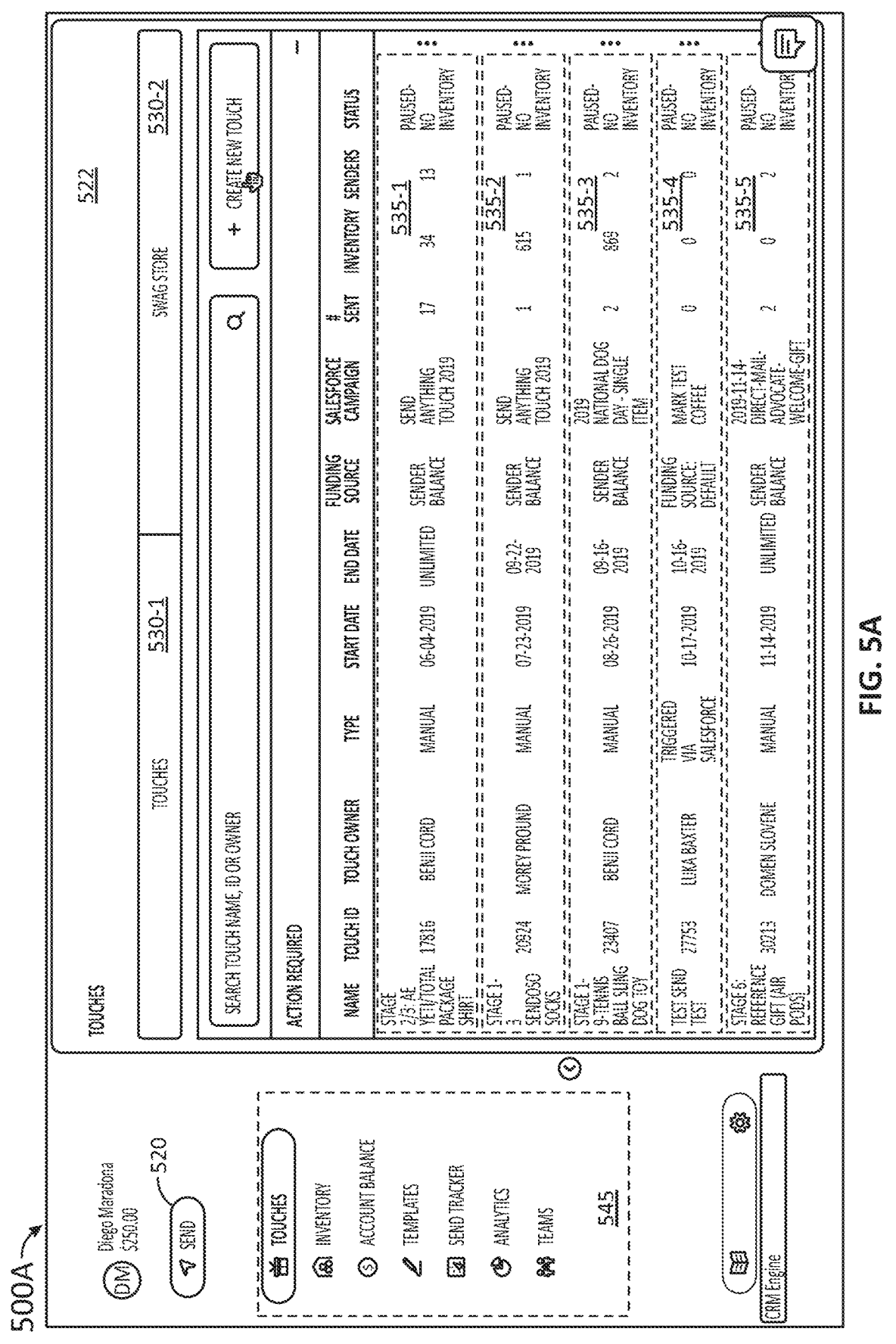

FIG. 5A illustrates screenshot 500A, which may include a 'Touches' tab 530-1 and a swag store tab 530-2 (hereinafter, collectively referred to as "tabs 530"). Tab 530-1 may include a list of gift packages 535-1, 535-2, 535-3, 535-4, and 535-5 (hereinafter, collectively referred to as "packages 535") that the user has access to. Packages 535 include a name, a touch ID, a Touch Owner (e.g., the person in the network who created the package), a type (manually triggered, or triggered by a third party networking service), a start date, an end date, a funding source, a campaign source, and other data such as date sent, inventory availability of the items in the package, the senders, and the status.

Figure 5B:
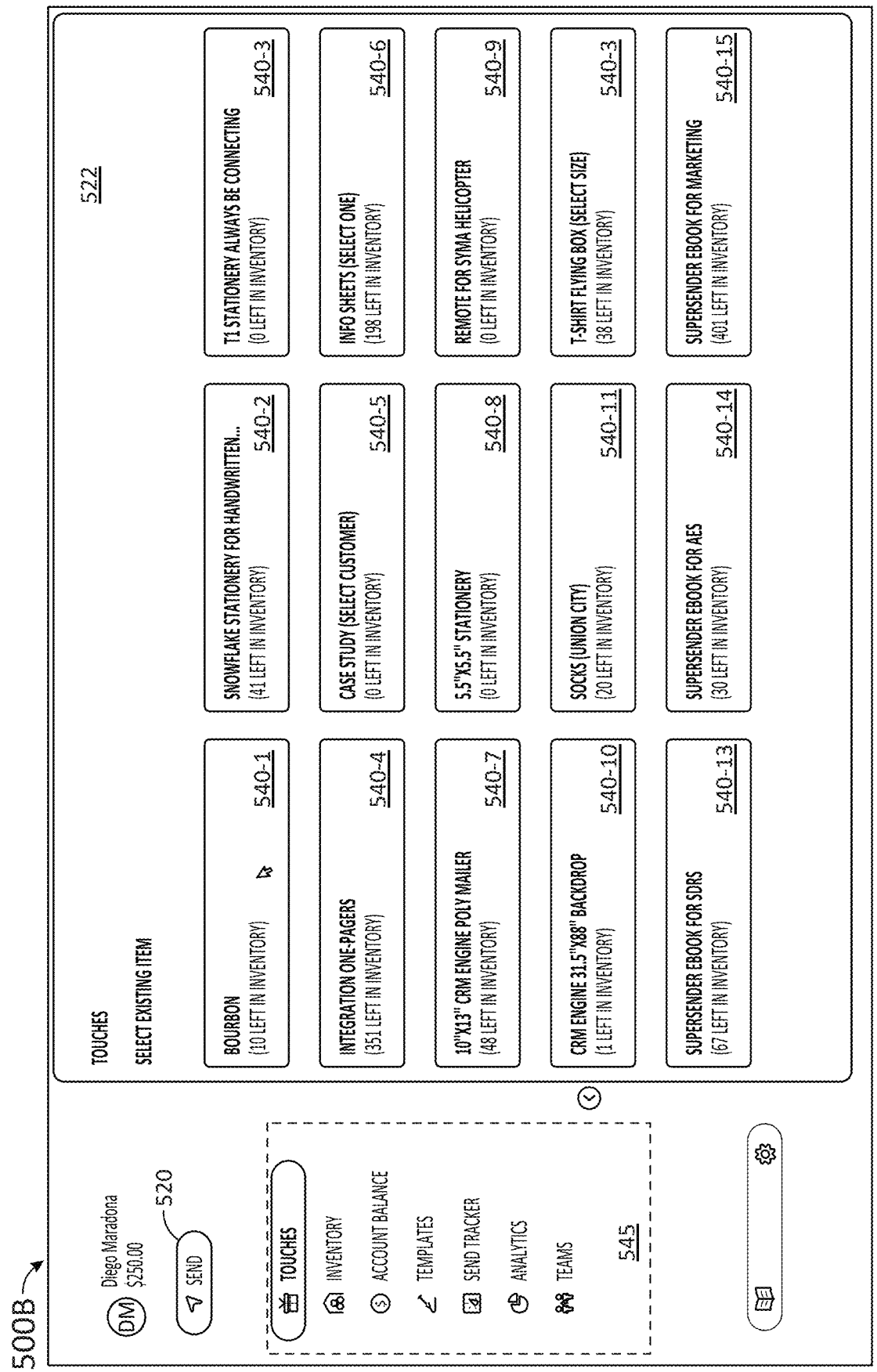

FIG. 5B illustrates screenshot 500B, which includes gift items or "Touches" that the user may choose to include in a gift package. Accordingly, application 522 may classify the items into different categories 540-1 (liquor, e.g., 'Bourbon'), 540-2 (stationery for handwritten notes), 540-3 (Stationery), 540-4 (one-pagers), 540-5 (case study), 540-6 (Info sheets), 540-7 (Mailer), 540-8 (Stationery), 540-9, 540-10, 540-11 (clothing), 540-12 (clothing), 540-13 (e-book), 540-14 (e-book), and 540-15 (e-book), hereinafter, collectively referred to as "categories 540."

FIG. 5C illustrates screenshot 500C, which includes additional details 550, such as the ability to "set limits for Teams instead of Users," "Hide Dollar Amount from Sender," "Do Not Allow Sending to PO Boxes," "Require Signature," "Additional Field on Send Page," "Allow Sender to Send Multiple Quantities of this Touch (Package) to Same Recipient," and "Limit Touch (Package) Based on Third-Party Criteria."

Figure 5D:
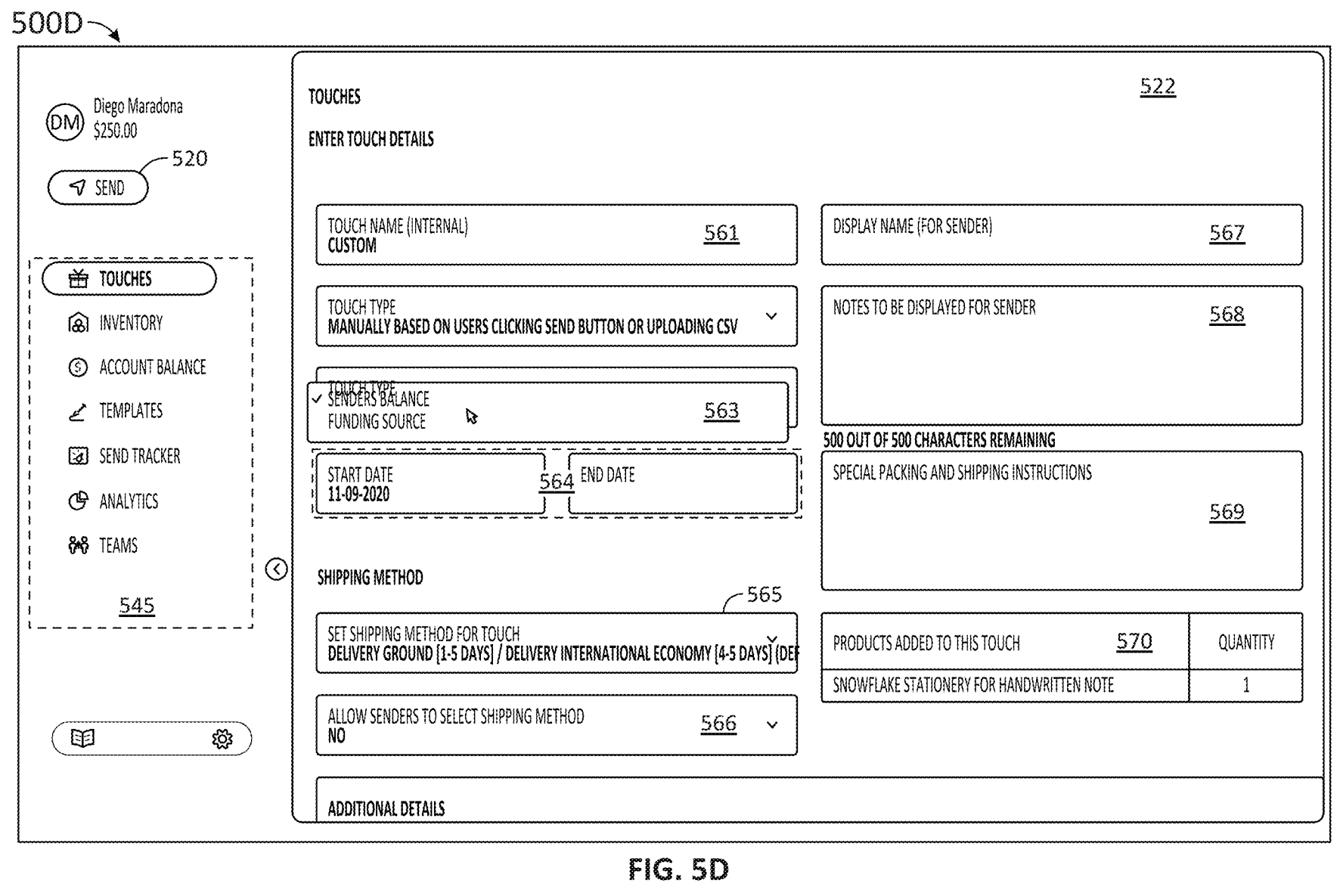

FIG. 5D illustrates screenshot 500D, which includes entries for further details in the package, such as a touch name 561, a touch type, a funding source 563, a start/end date 564, a shipping method 565, and a tab 566 to allow the sender to select the shipping method. Screenshot 500D also includes a tab 567 to display the sender's name, a tab 568 to include notes displayed for sender, a tab 569 to include special packing and shipping instructions, and a tab 570 to list the items or products included in the package.

Figure 5E:
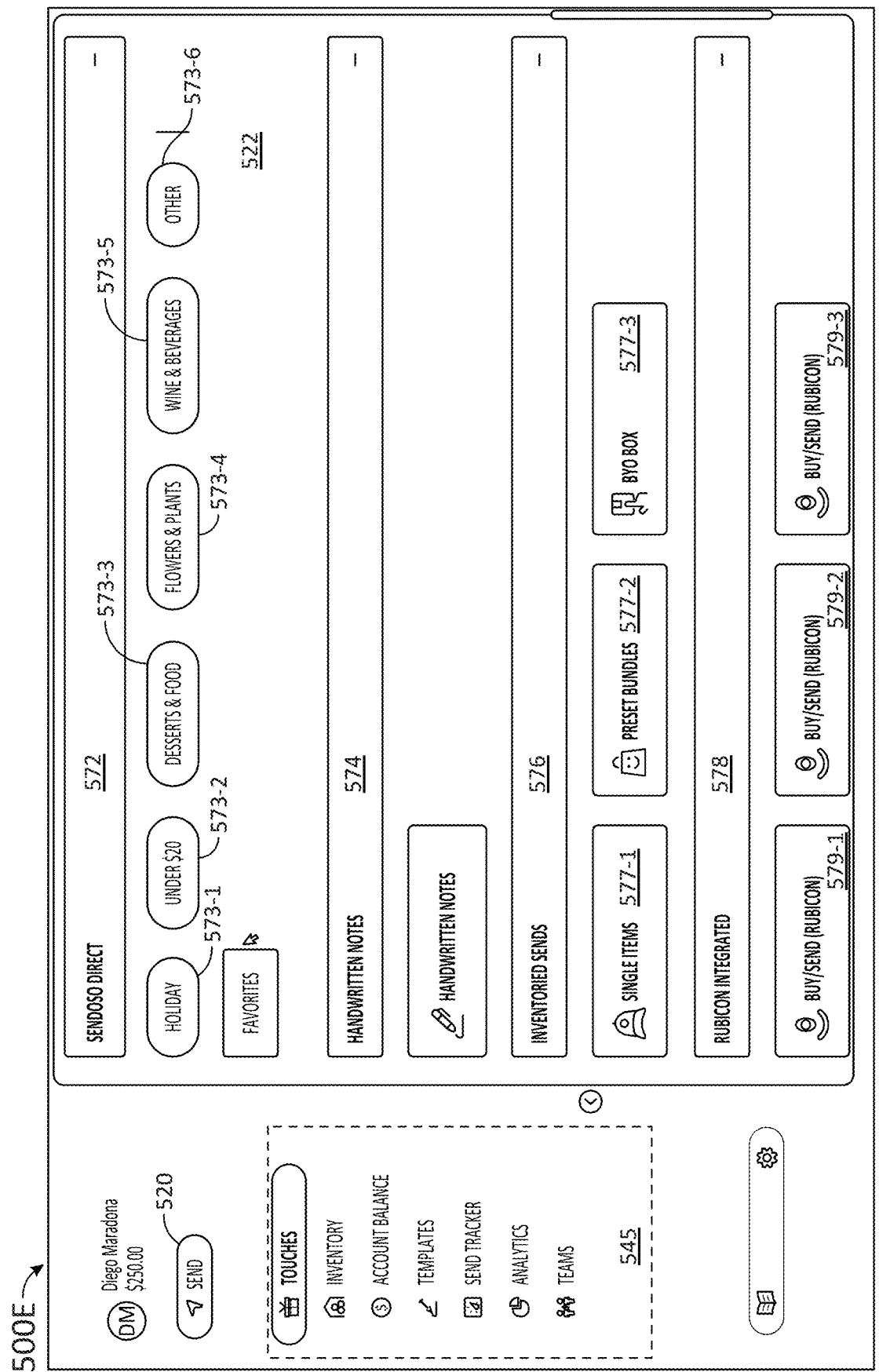

FIG. 5E illustrates screenshot 500E, which includes a field 572 to identify items for a package available through a specific provider. Field 572 may include different types of gifts, such as holiday 573-1, under $20 type 573-2, desserts & food type 573-3, flowers and plants type 573-4, wine and beverages type 573-5, and other types 573-6. A field 574 may provide access to handwritten notes, and a field 576 may include access to inventoried fields, such as single items 577-1, preset bundles 577-2, and brew-your-own box 577-3. Screenshot 500E may also include gift items suggested or available through an integrated third party, online shopping site 578 through buy/send tabs 579-1, 579-2, and 579-3 (hereinafter, collectively referred to as "Buy/Send tabs 579").

Figure 5F:
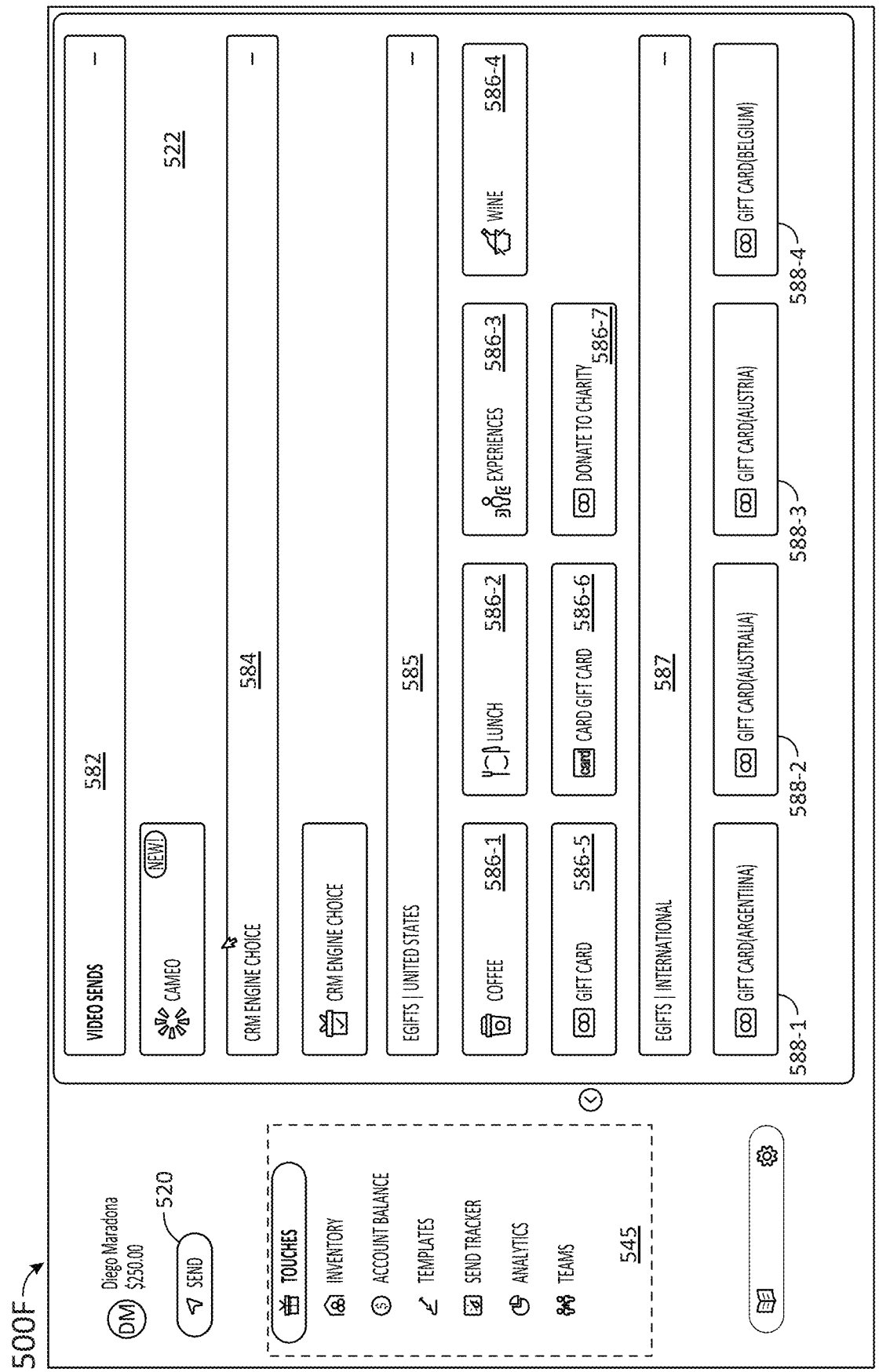

FIG. 5F includes screenshot 500F, which includes other types of gift items such as video sends 582, a CRM engine choice 584, electronic e-Gifts (US) 585, and e-Gifts (International) 587. For example, e-Gift 585 may include "coffee" 586-1, "Lunch" 586-2, "Experiences" 586-3, "Wine" 586-4, "Gift Card" 586-5, "Visa Gift Card" 586-6, and "Donate to Charity" 586-7. E-Gift international 587 may include "Gift Cards" 588-1, 588-2, 588-3, and 588-4.

Figure 5G:
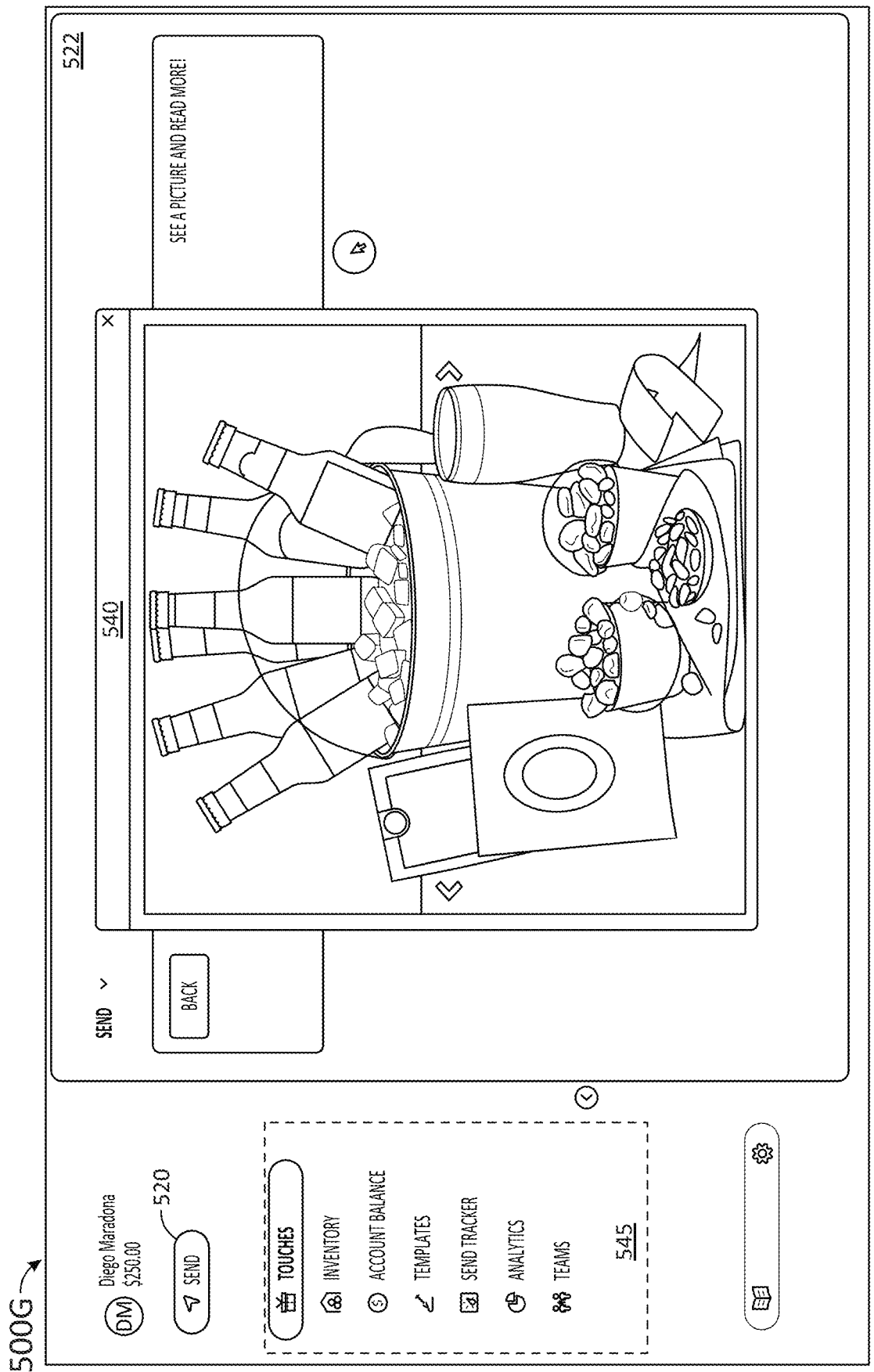

FIG. 5G illustrates screenshot 500G, which includes a picture 540 of one of the items selected by the user for a gift package.

Figure 6A:
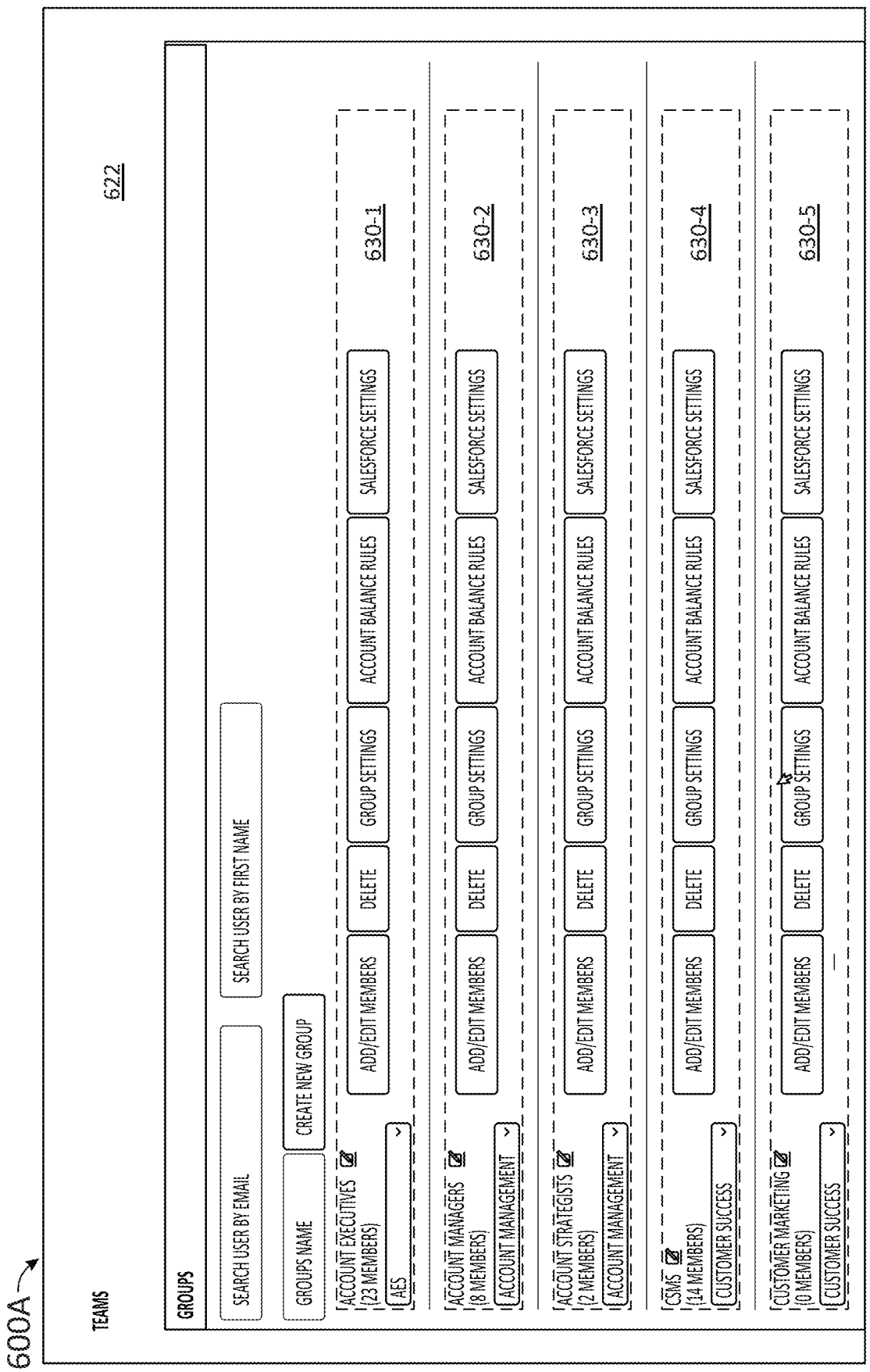
FIGS. 6A-6C illustrate screenshots in an application hosted by a client relations management engine, according to some embodiments.
Figure 6B:
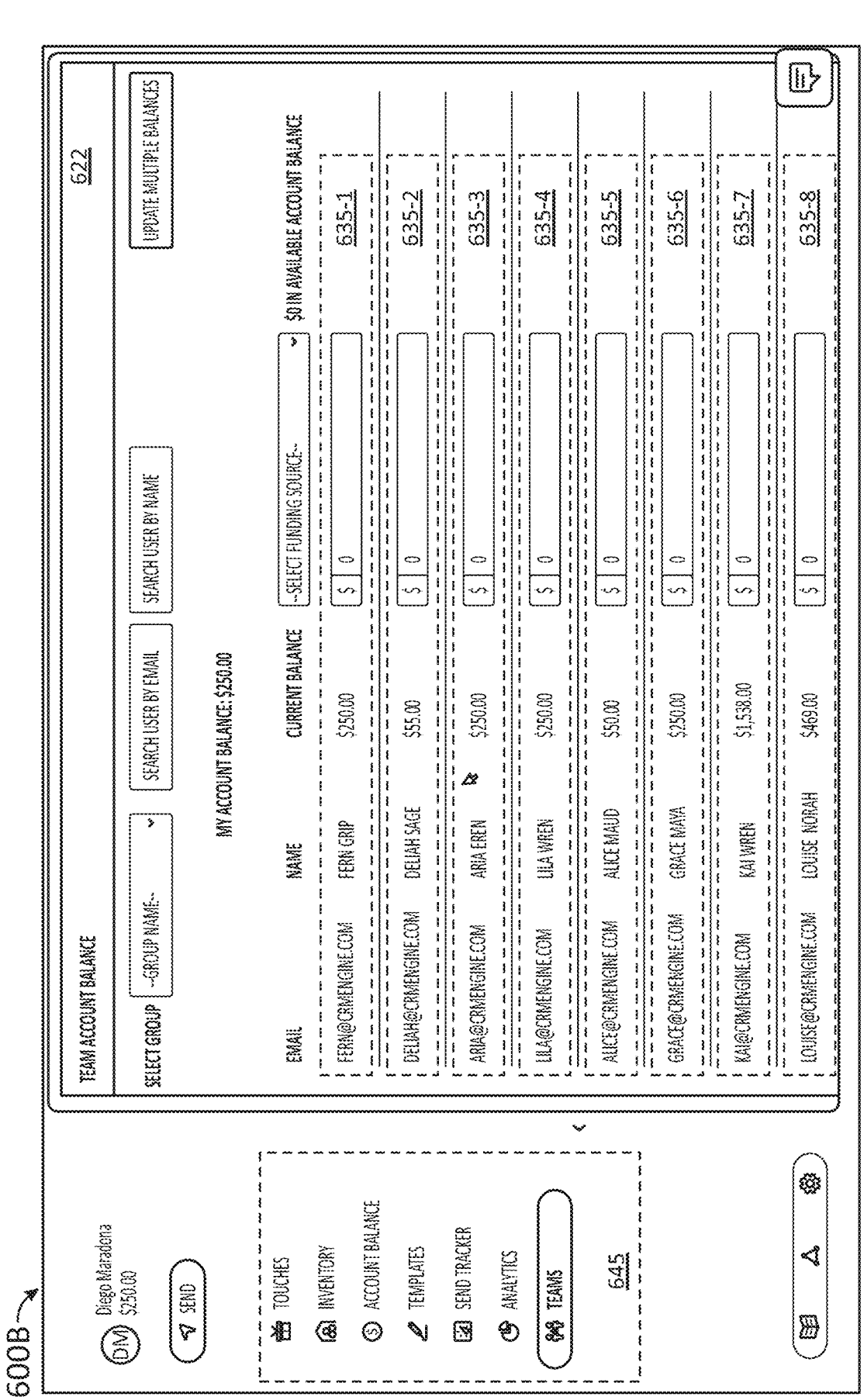
Figure 6C:
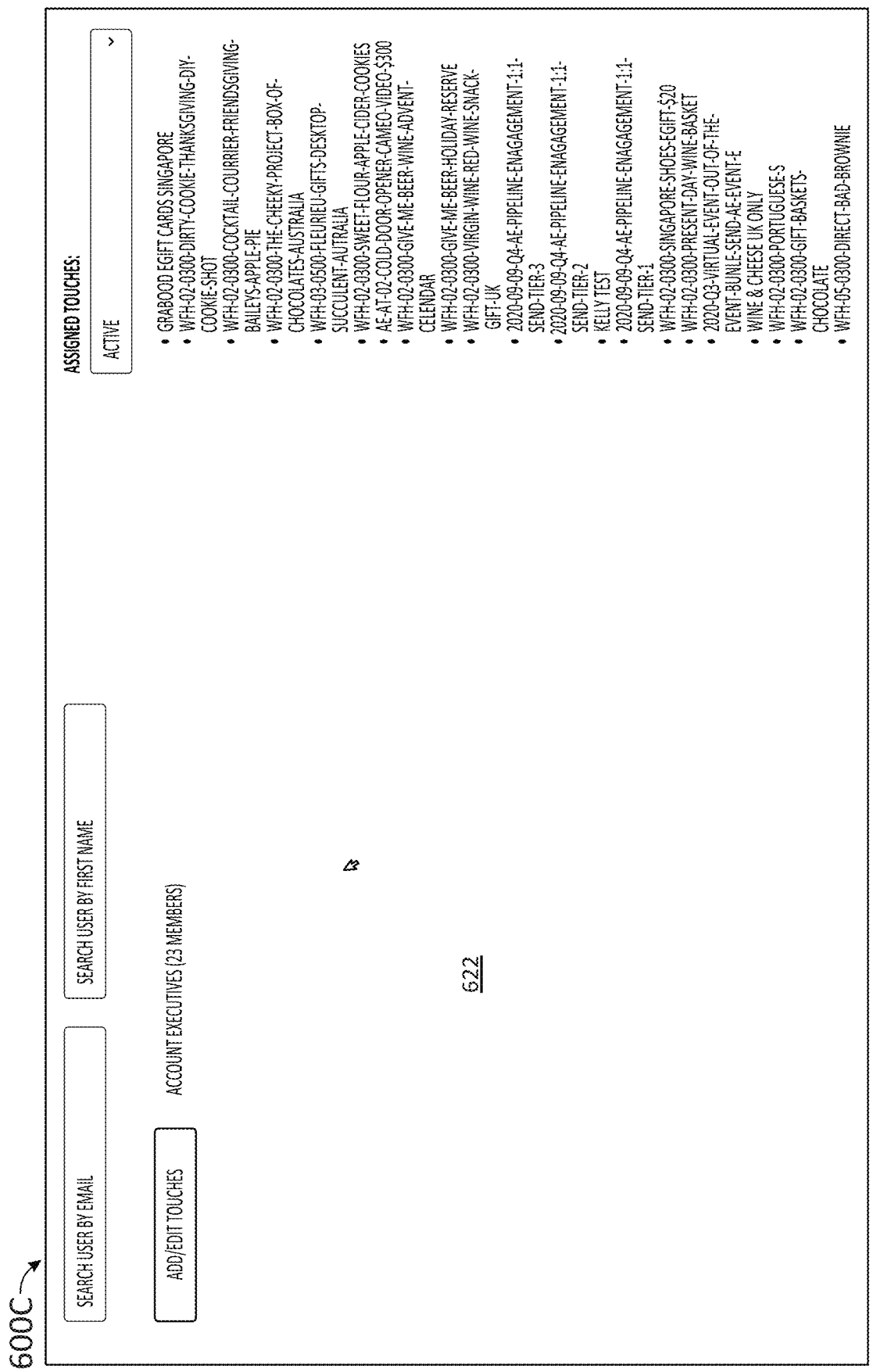

FIGS. 6A-6C illustrate screenshots for networking consoles 600A, 600B, and 600C (hereinafter, collectively referred to as "networking consoles 600") in an application 622 hosted by a client relations management engine, according to some embodiments. Menu field 645 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

FIG. 6A illustrates screenshot 600A, which includes multiple members of a network that the user may access, classified by job title. Accordingly, screenshot 600A includes account executives 630-1, account managers 630-2, account strategists 630-3, managers 630-4, and customer marketing members 630-5.

FIG. 6B illustrates screenshot 600B, which includes the account balance for different members 635-1, 635-2, 635-3, 635-4, 635-5, 635-6, 635-7, and 635-8 in the network.

FIG. 6C illustrates screenshot 600C, which includes a full list of account executives and the assigned gifts or touches associated with the list of executives.

Figure 7A:
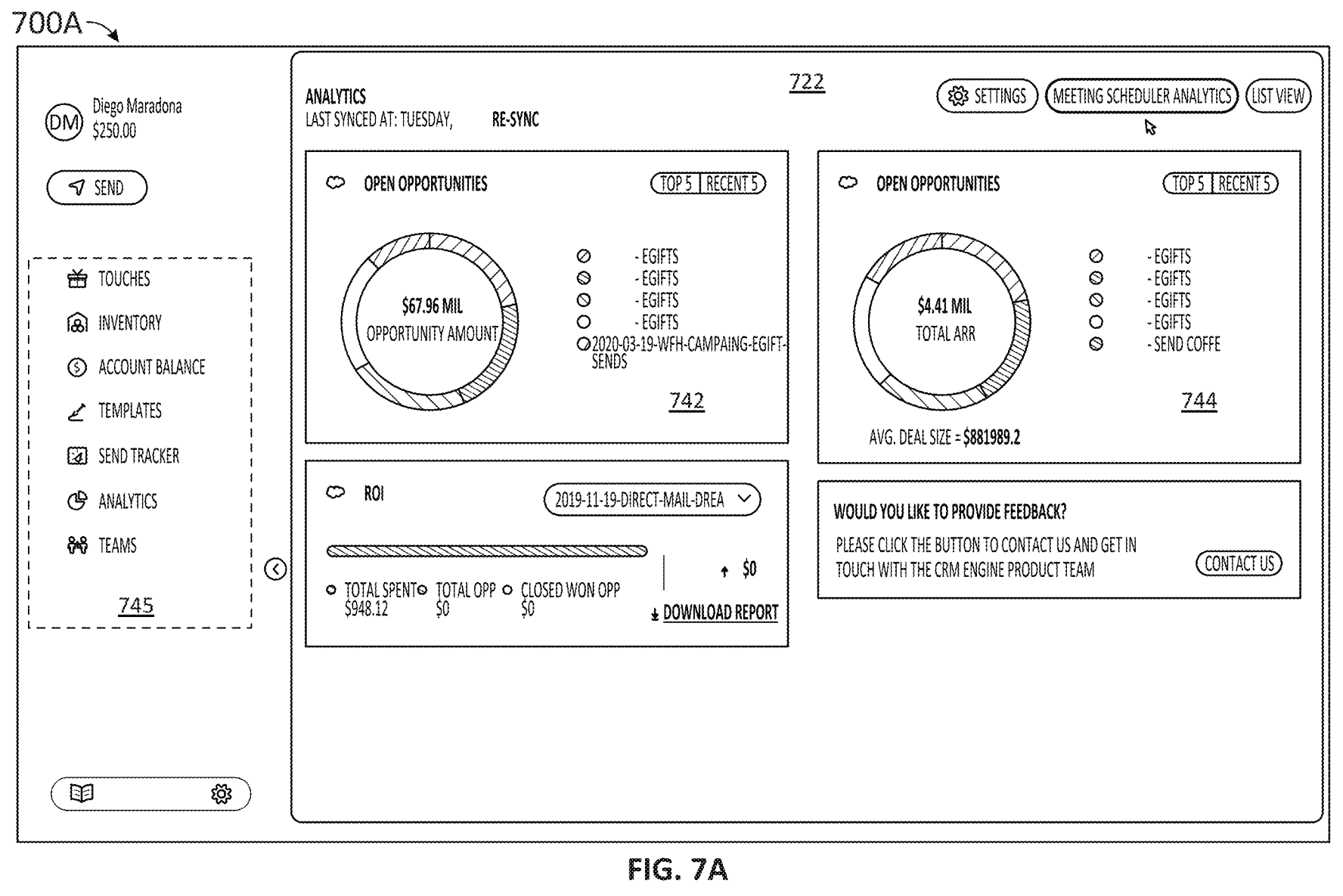

FIGS. 7A-7B illustrate screenshots for analytics consoles 700A and 700B (hereinafter, collectively referred to as "analytics consoles 700") in an application 722 hosted by a CRM engine, according to some embodiments. The user runs application 722, which displays a menu field 745 in a client device handled by the user. Menu field 745 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

FIG. 7A illustrates screenshot 700A, which includes a chart 742 for open opportunities and a chart 744 for closed won opportunities.

FIG. 7B illustrates screenshot 700B, which includes a meeting scheduler analytics such as a conversion rate 730-1, a total meeting sends 730-2, a total meetings scheduled 730-3, a total gifts redeemed 730-4, and a number of expired universal resource libraries (URLs) 730-5. Screenshot 700B includes sender statistics 735-1, 735-2, 735-3, 735-4, and 735-5 (hereinafter, collectively referred to as "sender statistics 735").

Figure 8:
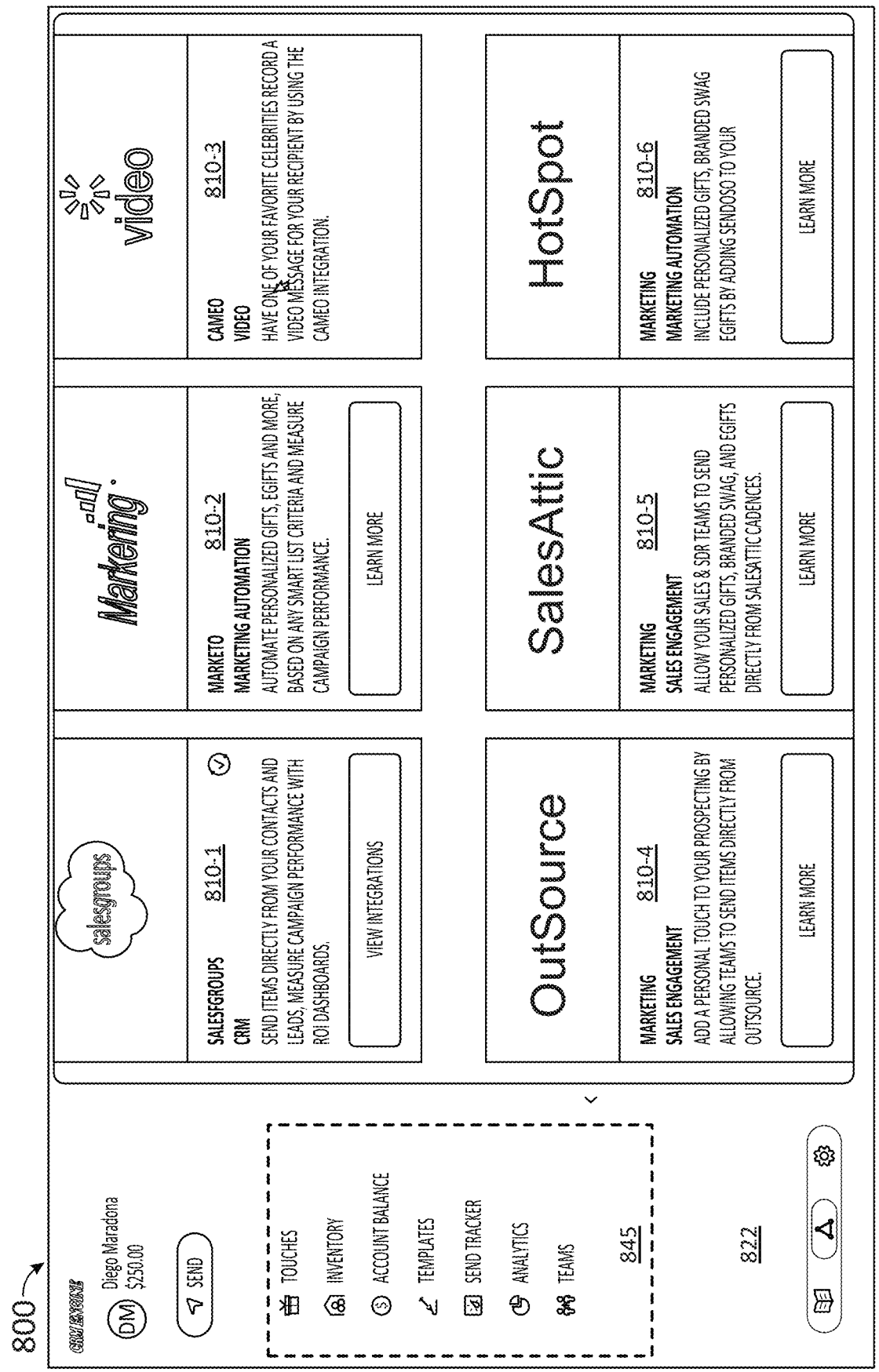
FIG. 8 illustrates a screenshot in an application hosted by a client relations management engine, according to some embodiments.

FIG. 8 illustrates a screenshot 800 in an application 822 hosted by a CRM engine, according to some embodiments. The user runs application 822, which displays a menu field 845 in a client device handled by the user. Menu field 845 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

Screenshot 800 includes multiple third party services 810-1, 810-2, 810-3, 810-4, 810-5, and 810-6 (hereinafter, collectively referred to as "third party services 810") available for the user of application 822. Accordingly, the user may select any one of third party services 810 to include a gift item in a gift package. Third party services 810 may include a customer/client network server that has a list of enterprises and personnel in those enterprises, including addresses, contact information, network connections, job titles, and the like. Third party services 810 may also include online shopping services, and other specialized services that a user may be interested to include in a gift package to a selected gift recipient.

In some embodiments, a third party service (e.g., server 810-3) may provide a "video messaging" service wherein a preferred individual, performer, sportsperson, and the like provides a video/voice message personally addressed to a gift recipient. In some embodiments, server 810-3 may include providing memorabilia for a preferred sports team (e.g., by the recipient) as a gift. In some embodiments, recipient attributes such as a preferred sports, team, performer, and the like may be determined by the CRM engine based on publicly accessible online data associated with the recipient.

In some embodiments, third party services 810 are integrated in the CRM engine by synchronization of the databases and other marketing tools form the third party services with the engines and tools of the CRM engine (e.g., inventory tool 272, networking tool 242, logistics tool 244, package preparation tool 246, package delivery tool 248, and scheduling tool 250). In some embodiments, a CRM engine as disclosed herein allows a user, via application 822, to send the same group of gifts across a myriad of different software platforms such as CRMs and marketing software, that share at least some of their data.

FIGS. 9A-9E illustrate screenshots for send consoles 900A, 900B, 900C, 900D, and 900E (collectively referred to, hereinafter, as "send consoles 900") in an application 922 hosted by a CRM engine, according to some embodiments. The user runs application 922, which displays a menu field 945 in a client device handled by the user. Menu field 945 provides access to different tools in the CRM engine, such as a gift preparation tool ('Touches'), an inventory tool, an account balance tool, a templates tool, a send tracker tool, an analytics tool, and a networking tool ('Teams'), according to some embodiments. In some embodiments, application 922 provides, through send consoles 900, suggested timing of when to send gift ideas based on CRM, MAP, or Sales Engagement tools and engines described herein, or on API signals (job change, funding news) that trigger a physical gift delivery.

Figure 9A:
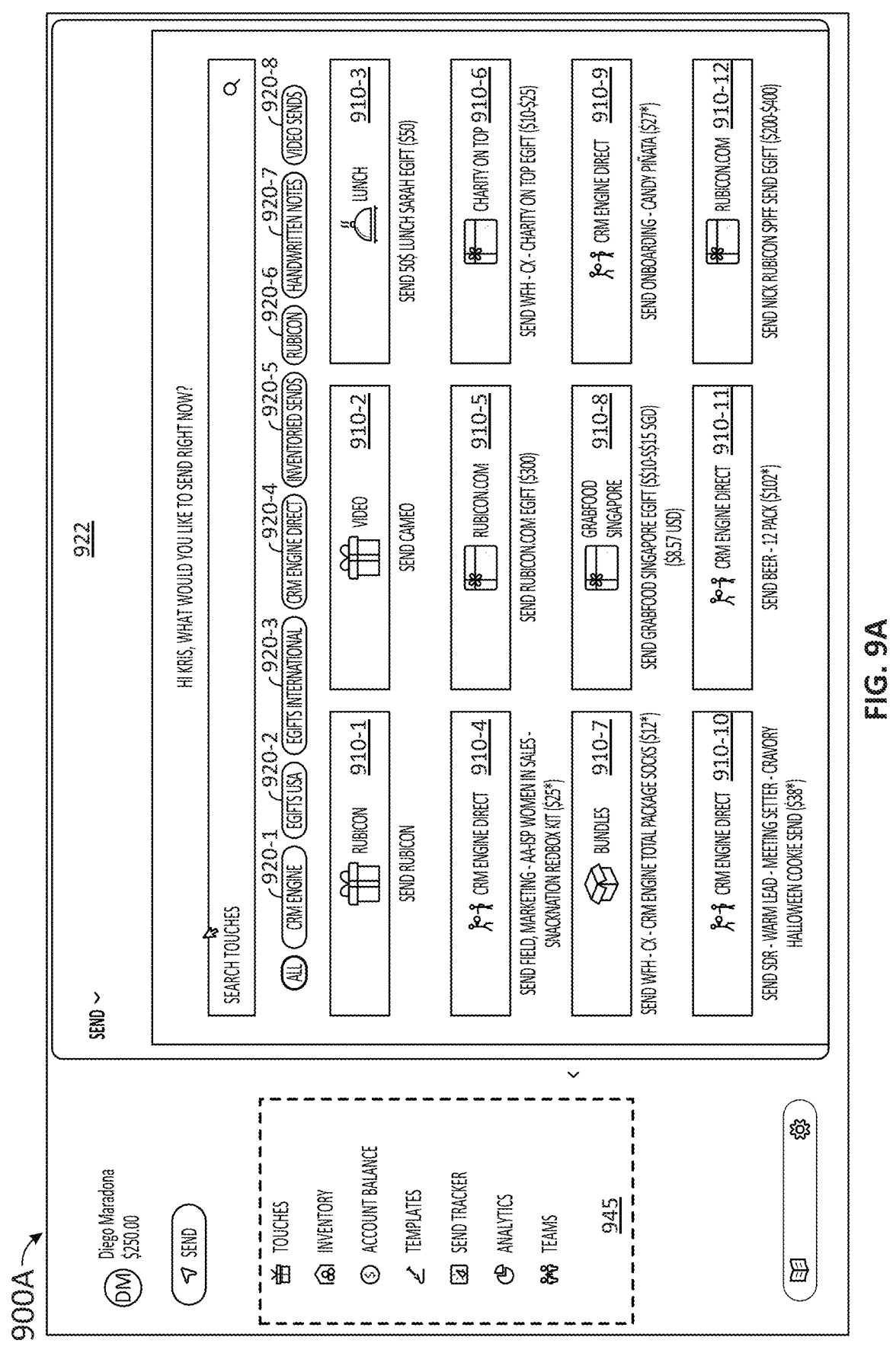

FIG. 9A illustrates send console 900A, which includes a send tab prompting the user to begin a send process for a gift package. The user may select from a CRM choice 920-1, an e-gift US choice 920-2, an e-gift international choice 920-3, a CRM direct choice 920-4, inventoried sends 920-5, a third party send 920-6, a handwritten choice 920-7, and a video send 920-8 (hereinafter, collectively referred to as "send choices 920"). Further, screenshot 900A may provide within all the categories of items to include in a gift package, a more refined list of items 910-1, 910-2, 910-3, 910-4, 910-5, 910-6, 910-7, 910-8, 910-9, 910-10, 910-11, and 910-12 (hereinafter, collectively referred to as "send choices 910").

In some embodiments, send console 900A may provide recommended sends to users. Accordingly, application 922 may set up triggers for which user should be recommended based on CRM/MAP data. Application 922 may use third party data or application programming interfaces to display for the user WHY to send a gift package (e.g., job change, promotion, office move, funding, weather conditions, company awards, reviews, notable social posts, podcast mentions, special events, and the like). In some embodiments, application 922 collects data from an interest tracker (cf., networking tool 242) to recommend WHAT to send (e.g., based on interest tags). In some embodiments, application 922 collects data from calendars/emails/CRMs (cf., scheduling tool 250) to recommend WHO and WHEN to send to (e.g., have an upcoming meeting, have a high-stakes business opportunity but only one person in buying committee received a gift, and the like). In some embodiments, application 922 may include pre-created "recipes" or commonly used recommended sends that can easily be toggled 'on' instead of created from scratch. In some embodiments, application 922 may be configured as a mobile application for quick, one-click approved sends. In some embodiments, application 922 may move the result of a research for a gift recipient (cf. networking tool 242) into a recommended Send queue. In some embodiments, a user accesses networking tool 242 and finds a potential recipient to whom the user has not sent a gift in over a selected period of time (e.g., several weeks or so), the user may request networking tool 242 to perform a research (via a button in application 922) on the interests of the potential recipient and then recommend "Send" (via a second button in application 922). Networking tool 242 may queue new Send ideas for the recipient in Recommended Send before application 922 completes the send. In some embodiments, application 922 may offer the user an auto send option and give the recipient a choice 920-1 to pick their own gift.

Figure 9B:
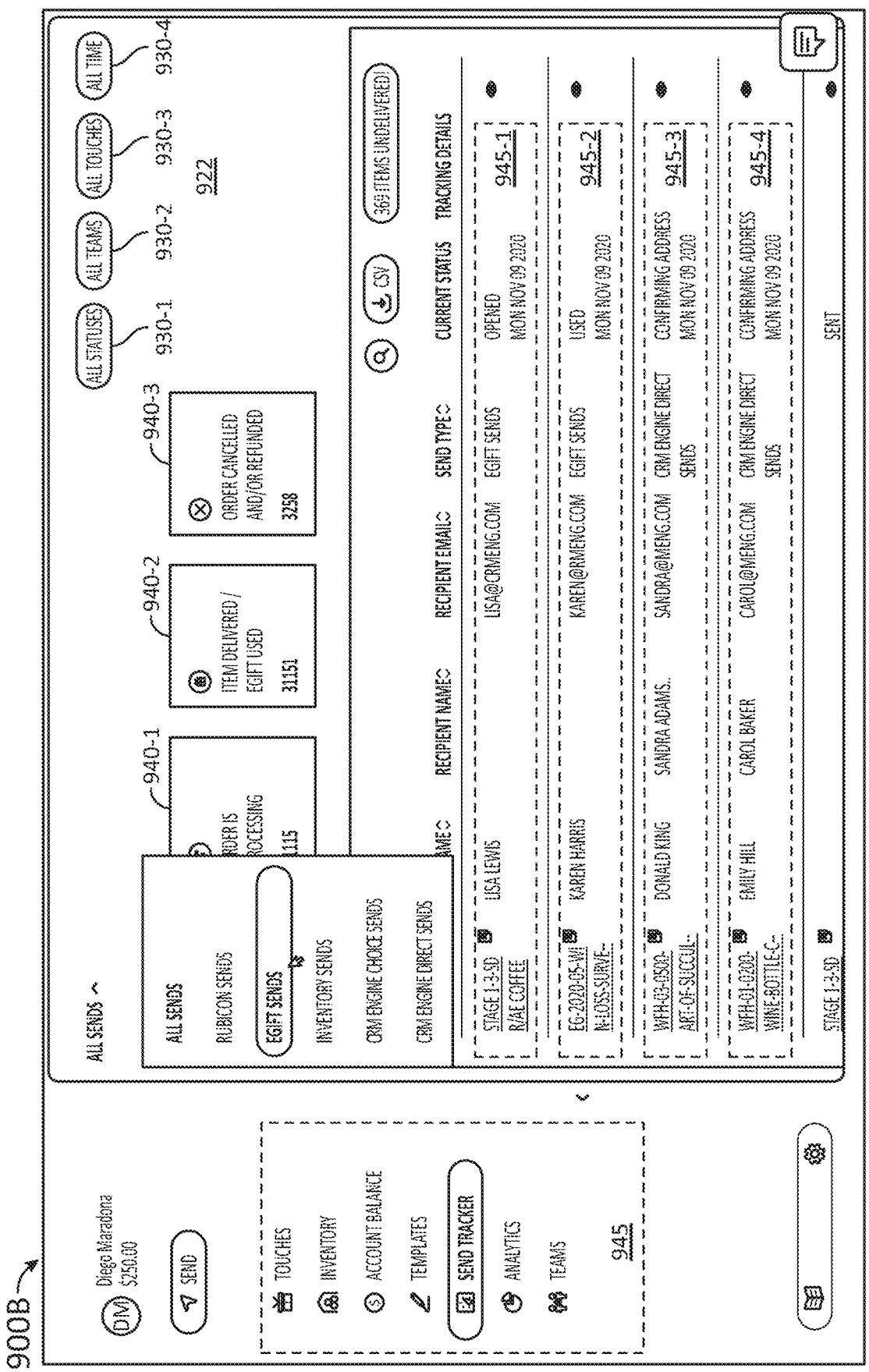

FIG. 9B illustrates send console 900B, which includes a list of sends provided by a send tracker tool in application 922. In some embodiments, screenshot 900B may include a tab 930-1 for the user to select all statuses, a tab 930-2 for the user to select all teams within the network, a tab 930-3 for the user to select all gift packages, and a tab 930-4 for the user to select all sending times (hereinafter, collectively referred to as "selection tabs 930"). Screenshot 900B may also include analytics tabs 940-1 (order in process), 940-2 (item delivered), and 940-3 (order cancelled) to provide data on the selected sends for the user. Screenshot 900B may also display line items 945-1, 945-2, 945-3, and 945-4 with further details on each of the selected send events (hereinafter, collectively referred to as "line items 945").

FIG. 9C illustrates send console 900C, which includes selection tabs 930 and more line items 945 (e.g., line items 945-5, 945-6, 945-7, 945-8, 945-9, 945-10, and 945-11).

Figure 9D:
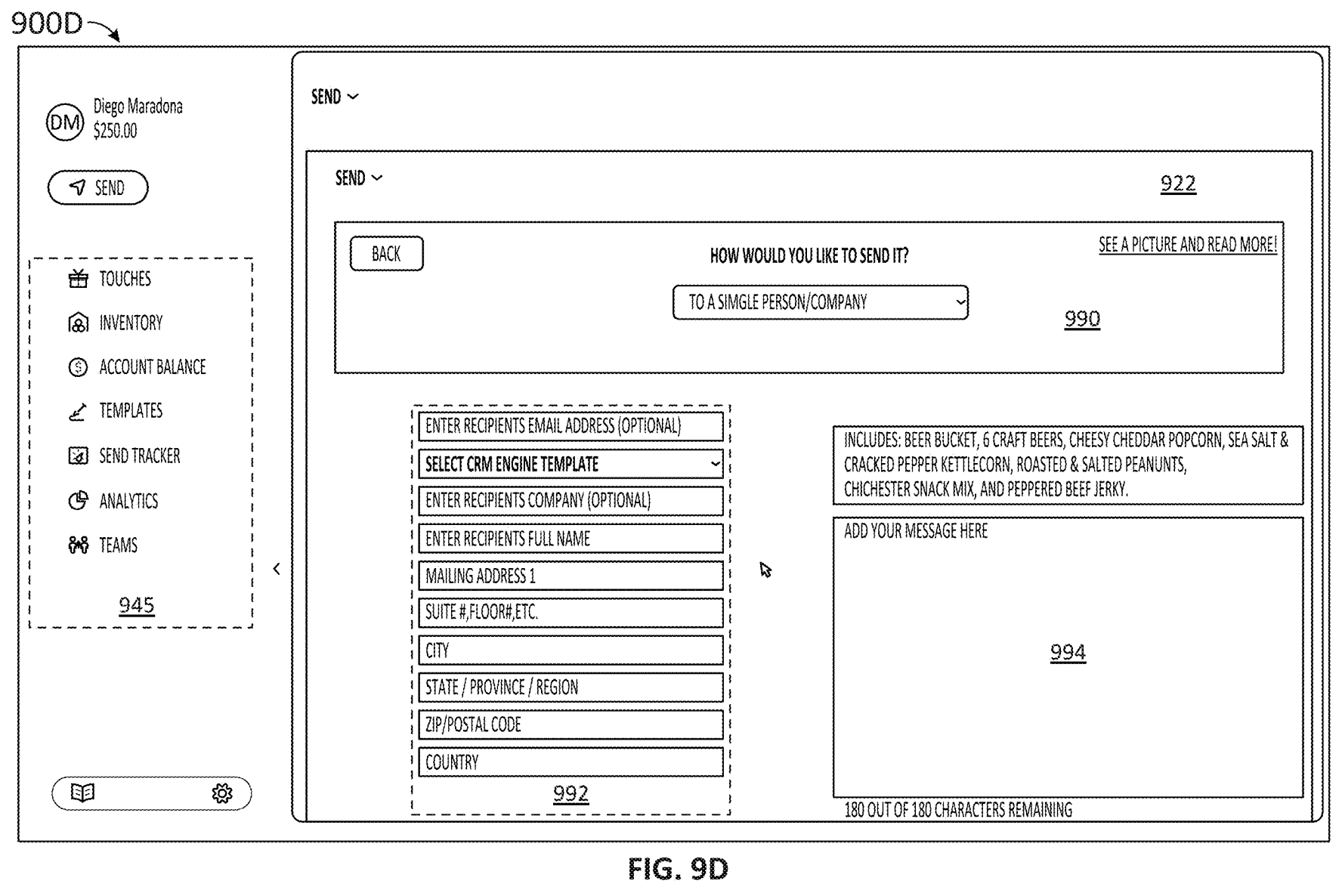

FIG. 9D illustrates send console 900D, which includes a send settings window having a field 990 to select a manner of sending the gift package (e.g., to a single person/company, or to a group of contacts). Other details and metadata for sending the gift package may be included in field 992, and a personal note may be added in fled 994.

Figure 9E:
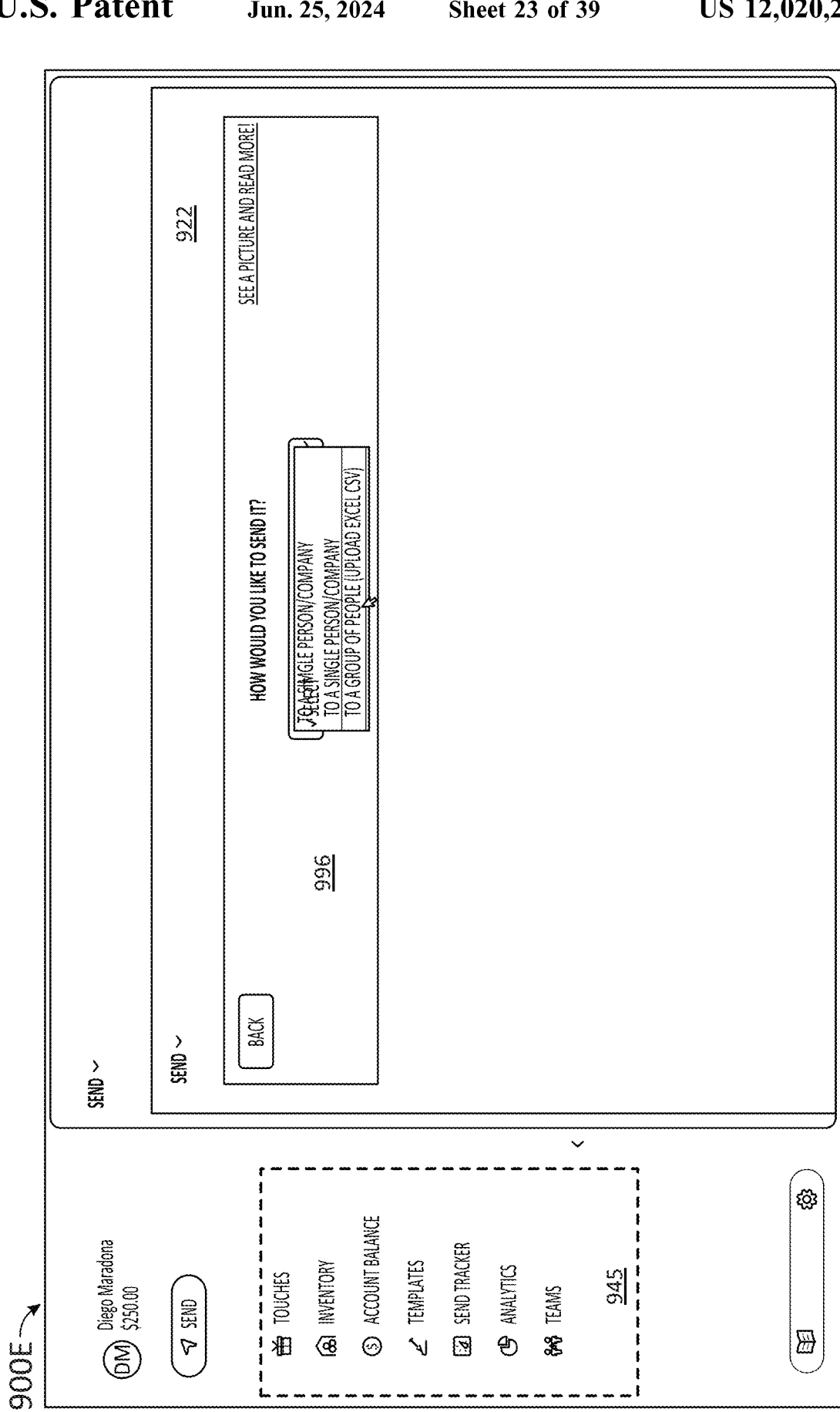

FIG. 9E illustrates send console 900E, which includes a prompt 996 for the user for selecting whether to send the gift package to a single person or company, or to send the gift package to a group of people. In the latter case, application 922 offers the option for the user to upload a comma-separated value file (CSV, e.g., an Excel sheet and the like) including lists of potential gift recipients. Prompt 996 may include an option for a group send, which provides the user with the ability to send multiple gift options to a group of recipients. In some embodiments, the group send may also have the group of recipients vote on which gift they want and the winning item is sent to all recipients in the group. Send console 900E may allow the user to send a gift package in real-time, via a virtual conferencing platform.

Figure 10A:
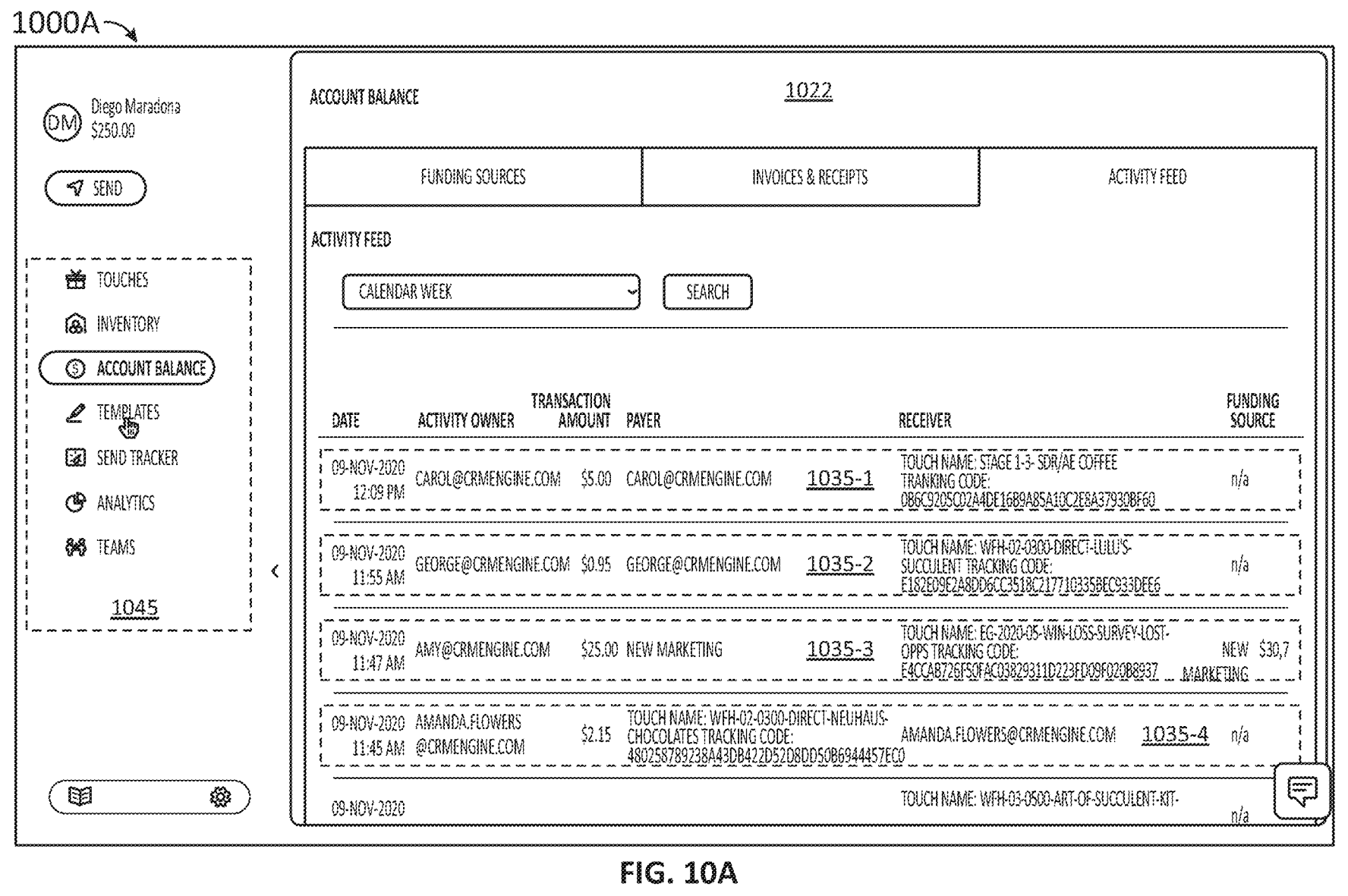
Figure 10B:
Figure 10C:
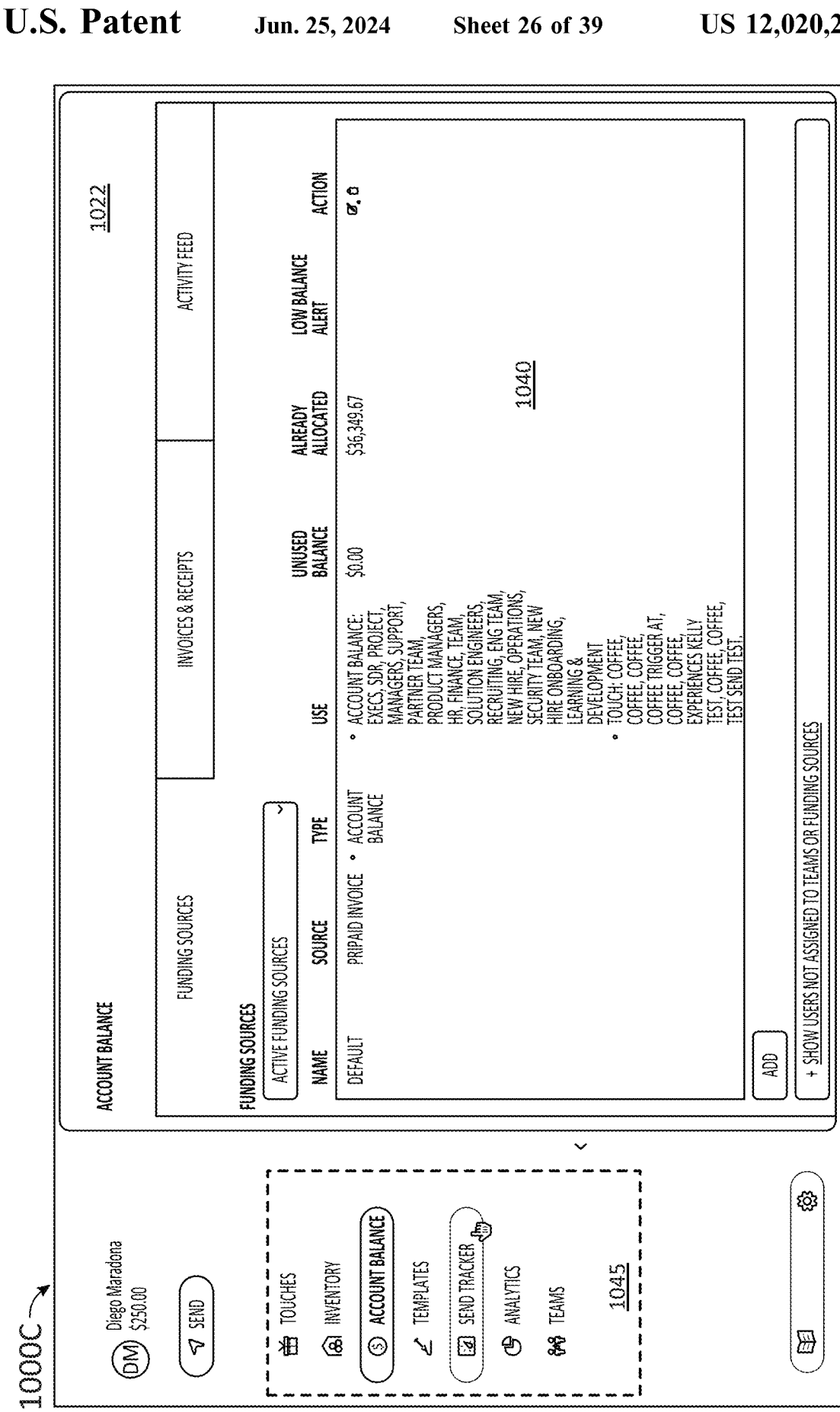

FIGS. 10A-10C illustrate screenshots in account balance consoles 1000A, 1000B, and 1000C (hereinafter, collectively referred to as "account balance consoles 1000") in an application 1022 hosted by a CRM engine, according to some embodiments. The user runs application 1022, which displays a menu field 1045 in a client device handled by the user. Menu field 1045 provides access to different tools in the CRM engine, such as a gift preparation tool ('Touches'), an inventory tool, an account balance tool, a templates tool, a send tracker tool, an analytics tool, and a networking tool ('Teams'), according to some embodiments. Account balance consoles 1000 allow the user to see how much budget and from which source has been spent, allocates, and remains un-used. In some embodiments, a CRM engine as disclosed herein may setup a dynamic budget for users selecting and sending gift packages. Accordingly, the CRM engine may assign budgets for sending users based on either their role, or the intended recipient's role, and their respective organizations, as established by a rules tool (e.g., rules tool 240 in CRM engine 232).

In some embodiments, account balance consoles 1000 may handle physical credit cards via stripe issuing that is given to senders. In some embodiments, account balance consoles 1000 may target credit cards to outside sales representatives, field representatives, CSMs visiting customers, and the like. In some embodiments, account balance consoles 1000 may provide pre-loaded credit cards having a pre-selected balance that they have in a customer account of the CRM network. Account balance consoles 1000 may offer users the ability to buy dinner, happy hour drinks, and the like, and track the expenditure and ROI. In some embodiments, application 1022 may be setup as a mobile application so that the user may review an exact balance remaining in an account, in real-time, from any location.

FIG. 10A includes screenshot 1000A, which illustrates an activity list with a list of transactions 1035-1, 1035-2, 1035-3, and 1035-4 (hereinafter, collectively referred to as "transactions 1035"). Transactions 1035 may include a date, an activity owner, a transaction amount, a payer, a receiver, and a funding source, according to some embodiments.

FIG. 10B includes screenshot 1000B, which illustrates multiple details for a specific transaction selected by the user, such as the funding source name, the funding type, currency, default payment options and other attributes such as auto-recharge, privileges, and status for different users.

FIG. 10C includes screenshot 1000C, which illustrates details about a funding source 1040.

Figure 11A:
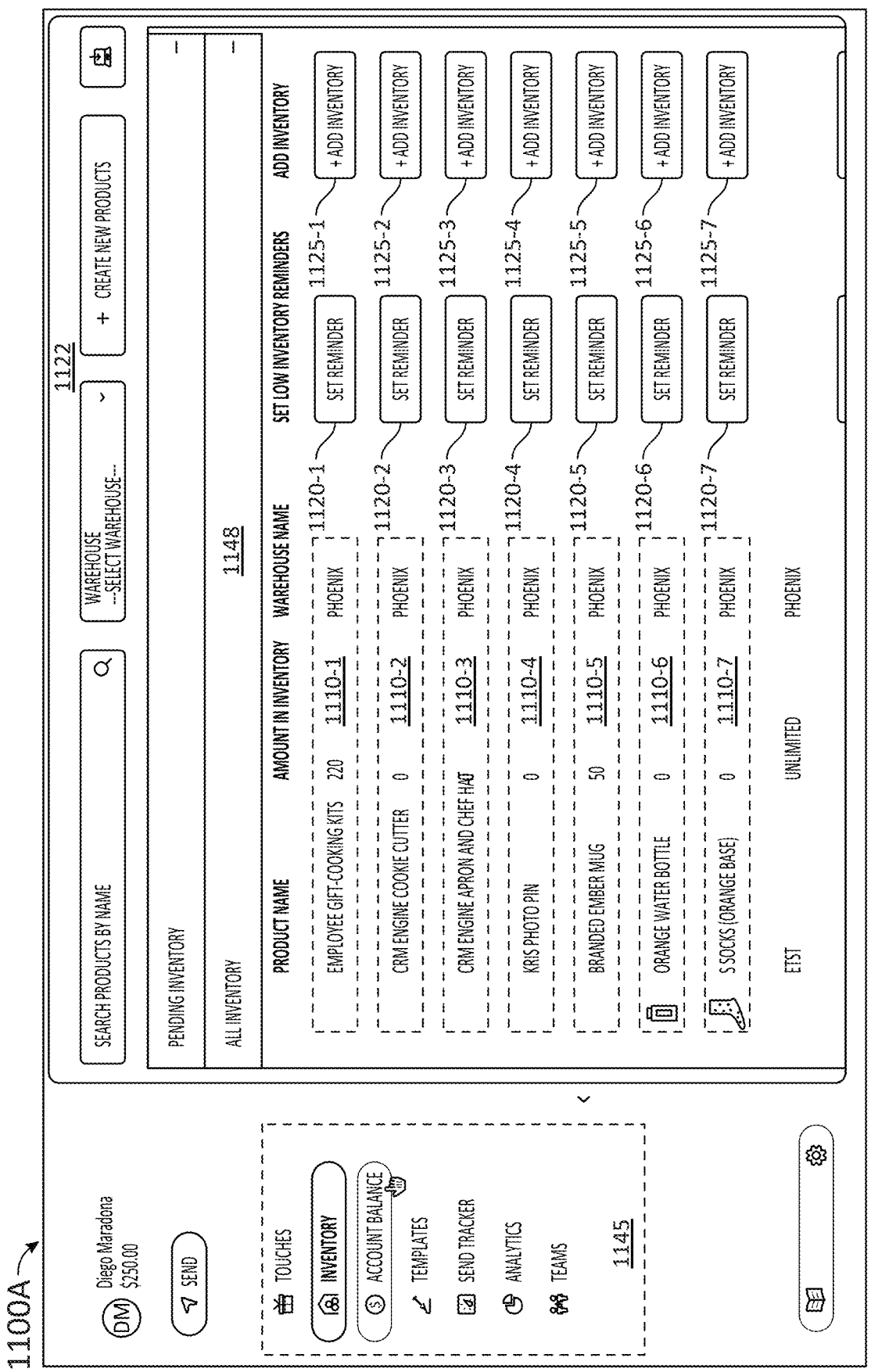

FIGS. 11A-11B illustrate screenshots for inventory consoles 1100A and 1100B (hereinafter, collectively referred to as "inventory consoles 1100") in an application 1122 hosted by a CRM engine, according to some embodiments. The user runs application 1122, which displays a menu field 1145 in a client device handled by the user. Menu field 1145 provides access to different tools in the CRM engine, such as a gift preparation tool ('Touches'), an inventory tool, an account balance tool, a templates tool, a send tracker tool, an analytics tool, and a networking tool ('Teams'), according to some embodiments.

FIG. 11A includes inventory console 1100A, which illustrates an inventory 1148 listing items 1110-1, 1110-2, 1110-3, 1110-4, 1110-5, 1110-6, and 1110-7 (hereinafter, collectively referred to as "items 1110"). For each of items 1110, screenshot 1100A illustrates the product name, the amount of items in the inventory, and the warehouse name. Screenshot 1100A also includes, for each of items 1110, a tab 1120-1, a tab 1120-2, a tab 1120-3, a tab 1120-4, a tab 1120-5, a tab 1120-6, and a tab 1120-7, respectively to set reminders (hereinafter, collectively referred to as "reminder tabs 1120"). Screenshot 1100A may also include, for each of items 1110, a tab 1125-1, a tab 1125-2, a tab 1125-3, a tab 1125-4, a tab 1125-5, a tab 1125-6, and a tab 1125-7, respectively (hereinafter, collectively referred to as "inventory tabs 1125") to add the item to the inventory.

FIG. 11B includes inventory console 1100B, which illustrates a tab 1130-1 for printed notecards or letterheads, and a tab 1130-2 for physical products.

Figure 12:
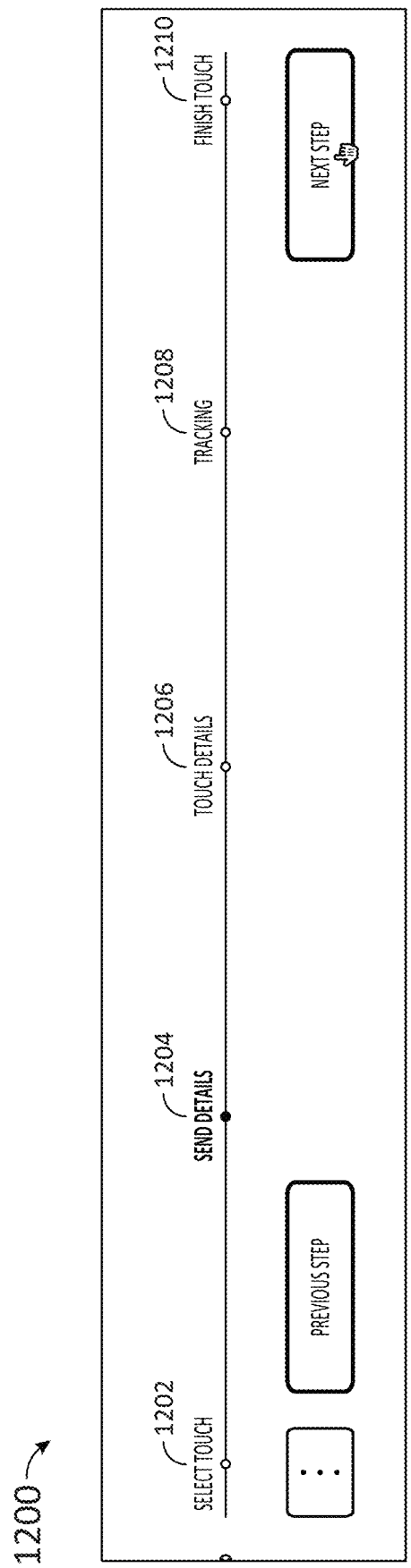
FIG. 12 illustrates a screenshot in an application hosted by a client relations management engine, according to some embodiments.
Figure 13A:
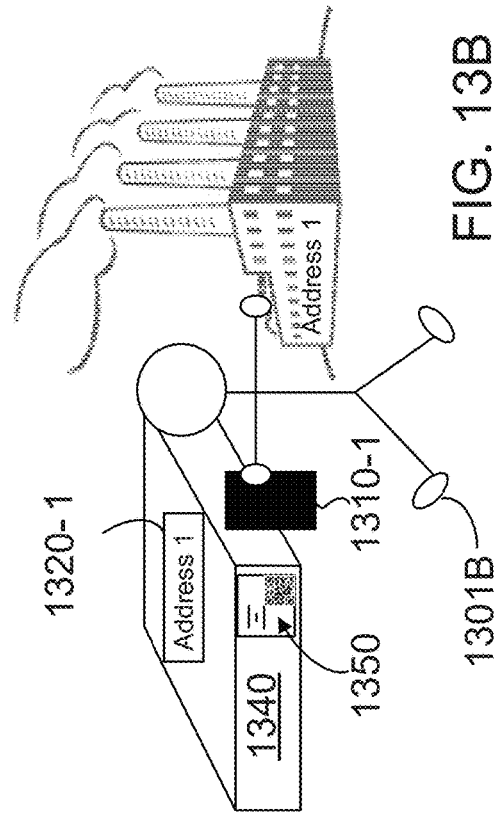
FIGS. 13A-13D illustrate vignettes for a method of providing a gift package to a first recipient at a secondary address, according to some embodiments.
Figure 13B:
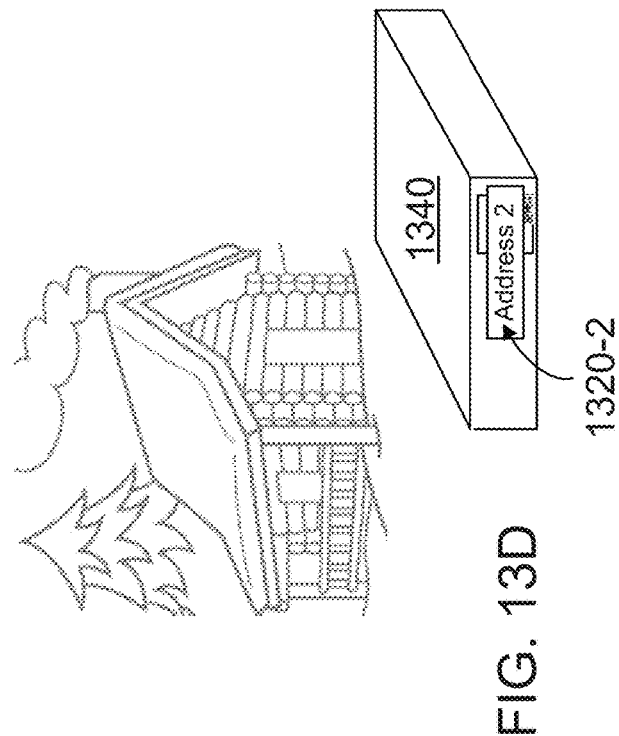
Figure 13C:
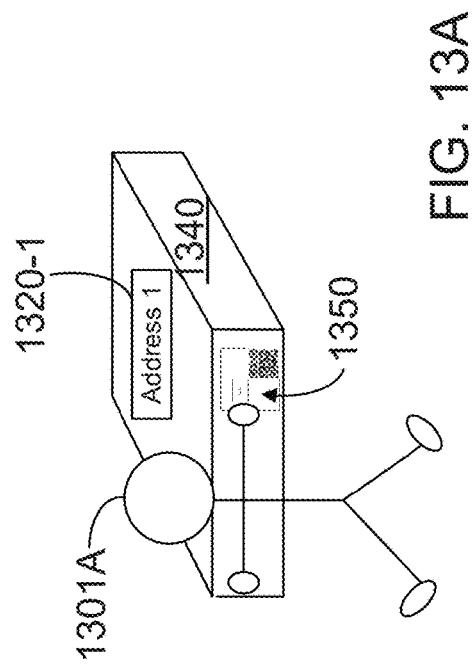
Figure 13D:
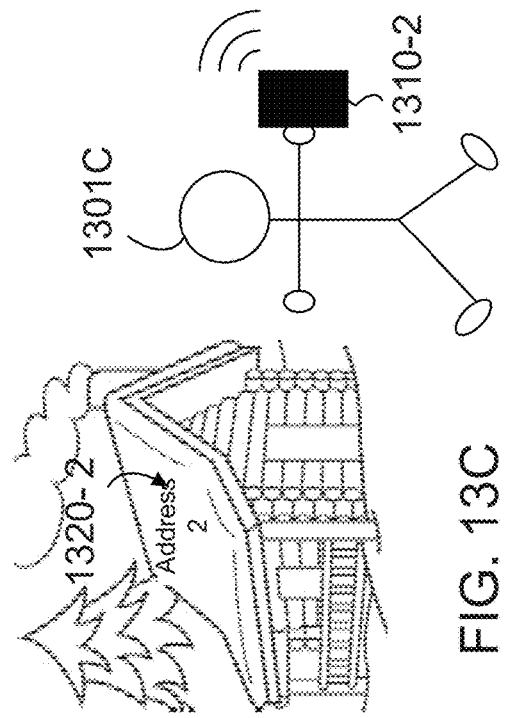

FIG. 12 illustrates a screenshot for a timeline 1200 in an application hosted by a CRM engine, according to some embodiments. Timeline 1200 may include a 'Select Touch or gift package' stage 1202, followed by a 'Send Details' stage 1204, a 'Touch Details' stage 1206, a 'Tracking' stage 1208, and a 'Finish Touch or Gift Package' stage 1210.

Accordingly, timeline 1200 is a description of the preparation and delivery of the gift package and may include labels for the different events (welcome & introductions, project description, decision making, tasks, adjournment, and the like). The user may decide to skip forward or backward through the different portions of the timeline.

FIGS. 13A-13D illustrate vignettes for a method of providing a gift package 1340 sent from a user 1301A to a first recipient 1301C at a secondary address 1320-2, according to some embodiments. The first recipient 1301C may be selected by user 1301A from a group of contacts in a database. User 1301A schedules a delivery of gift package 1340 including at least one item selected by user 1301A, to a first mailing address 1320-1.

The system provides user 1301A, for display on gift package 1340, a code 1350 configured to be scanned by a second recipient 1301B using a mobile device, a smartphone, or any client device 1310-1, when first recipient 1301C is not available at the first mailing address 1320-1. In some embodiments, the system is configured to provide user 1301A an indication that code 1350 has been scanned by second recipient 1301B. When second recipient 1301B scans code 1350, the system triggers a notification to be sent to first recipient 1301C, e.g., in a mobile device, a smartphone, or any other client device 1310-2, requesting first recipient 1301C to enter second mailing address 1320-2.

The system then provides, to client device 1310-1 with second recipient 1301B, a second notification comprising an indication to obtain a shipping label comprising the second mailing address 1320-2 of first recipient 1301C. The system also schedules a pickup of gift package 1340 to be shipped to second mailing address 1320-2.

Figure 14:
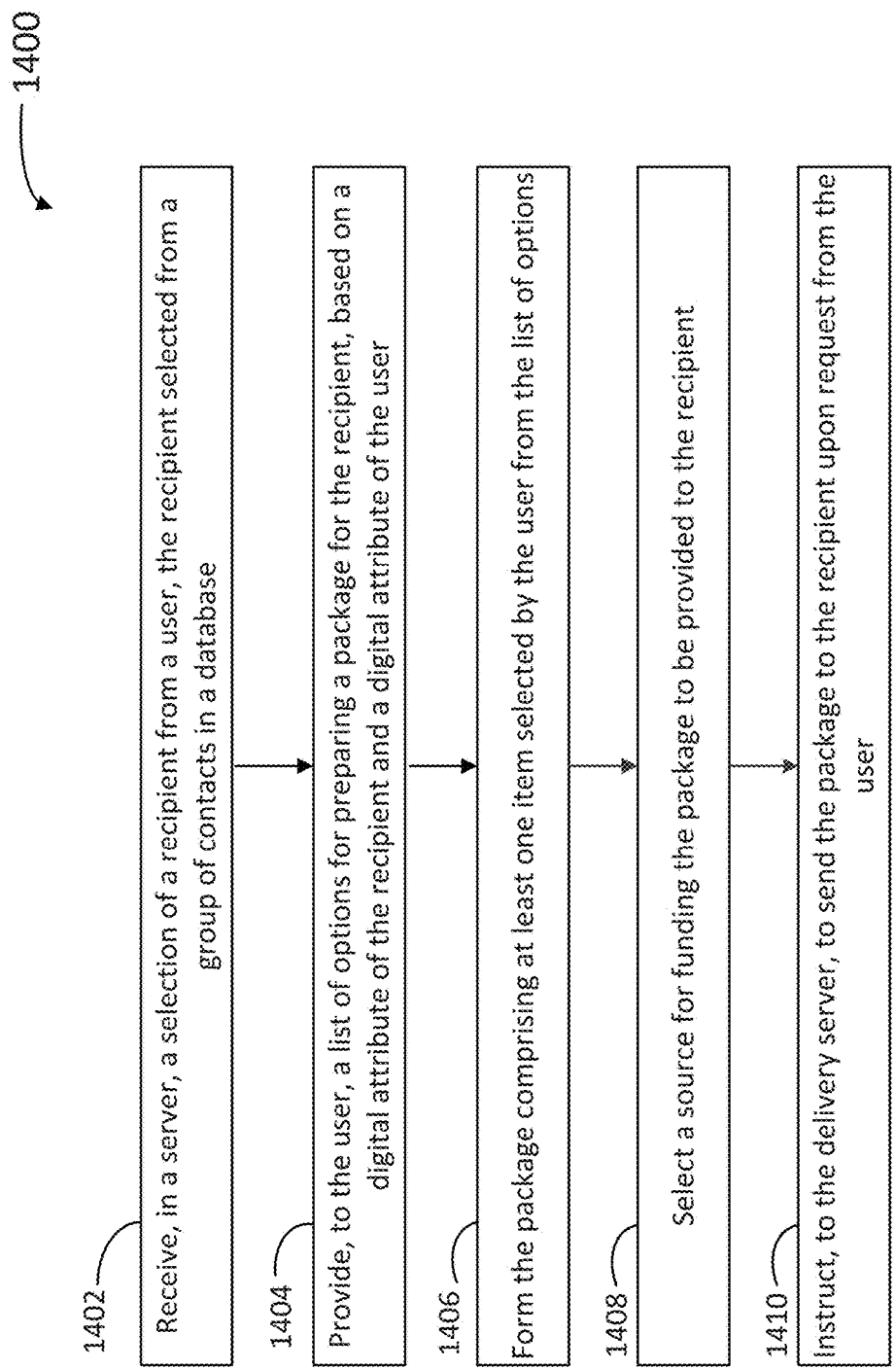
FIG. 14 is a flowchart illustrating steps in a method for selecting and providing a gift package to identified current and potential business contacts, according to some embodiments.

FIG. 14 is a flowchart illustrating steps in a method 1400 for selecting and providing a gift package to identified current and potential business contacts, according to some embodiments. Method 1400 may be performed at least partially by any one of the network servers hosting a CRM engine for users of client devices communicably coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1400 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1400 may include retrieving, editing, and/or storing files in a database that is part of, or is communicably coupled to, the computer (e.g., database 252). Methods consistent with the present disclosure may include at least some, but not all, of the steps illustrated in method 1400, performed in a different sequence. Furthermore, methods consistent with the present disclosure may include at least two or more steps as in method 1400 performed overlapping in time, or almost simultaneously.

Step 1402 includes receiving, in a server, a selection of a recipient from a user, the recipient selected from a group of contacts in a database. In some embodiments, the group of contacts forms a client network associated with the user, and step 1402 includes receiving a request from the user to send the gift package to at least one contact in the group of contacts and selecting the gift recipient based on the at least one contact. In some embodiments, step 1402 may include a suggestion of a gift recipient based on a company's CRM engine data, or data pulled from other sources, on a recipient user (e.g., a potential sales target). In some embodiments, step 1402 may include automatically tracking a third party network provider (e.g., a professional network provider) to determine when a potential recipient receives a promotion. Upon detection of a promotion, step 1402 may include suggesting the user to send a gift (or automatically sending the gift) to the recipient. In some embodiments, step 1402 may include providing a button for the CRM engine host in a third party video conference application. For example, in some embodiments, step 1402 may include displaying a QR code as a virtual background, so that an attendee in a video conferencing application can engage with the button/QR code to select a gift to send during a meeting or conference (or thereafter, or before).

Step 1404 includes providing, to the user, a list of options for preparing a package for the recipient, based on a digital attribute of the recipient and a digital attribute of the user. In some embodiments, the digital attribute of the recipient includes a job title of the recipient, and step 1404 includes verifying a return of investment for the user based on a prior history of presents with the group of contacts. In some embodiments, the digital attribute of the user includes a job title of the user, and step 1404 includes verifying a cap value for the list of options based on the digital attribute of the gift recipient and the job title of the user. In some embodiments, step 1404 includes providing a text message to include as a note in the gift package, the text message having a semantic content based on the digital attribute of the gift recipient and the digital attribute of the user. In some embodiments, step 1404 includes suggesting, to the user, gifts known to be deliverable within a certain time frame (e.g., same-day delivery available). For example, for an attendee in a third party conference service, a QR code displayed on the conferencing application can be scanned by the attendee using a smartphone. This may trigger a web page to be loaded on the attending user's phone to select a gift. The scanning process can be tied back to a particular campaign to show ROI for the campaign.

In some embodiments, step 1404 may include manually tracking the social media, email conversations (sender tracks their own conversations and makes notes of interest of recipient), and transcribed calls (e.g., using call reporting software) to identify interests of a recipient, and inputting it into software, the software suggesting gifts for the recipient (e.g., "Here's 3 bicycle related sends/gifts—pick one," and the like). In some embodiments, step 1404 may include removing time sensitive data on a schedule, to avoid "old" or obsolete data to be displayed for the user (e.g., a gift that is no longer valid, or has grown out of a window of opportunity such as seasonal cards, and the like).

Step 1406 includes forming the package including at least one item selected by the user from the list of options. In some embodiments, step 1406 includes requesting, from the recipient, to accept a calendar meeting before receiving a gift. In some embodiments, step 1406 may include entering a link for a meeting scheduled in a user's calendar application.

Step 1408 includes selecting a source for funding the package to be provided to the recipient.

Step 1410 includes instructing, to a delivery server, to send the package to the recipient upon request from the user. In some embodiments, step 1410 includes sending an electronic message to the recipient to verify a second address for delivery of the package when the gift package fails to be delivered at a first address, and providing the second address to the delivery server. In some embodiments, step 1410 includes providing to the recipient a meeting scheduler link to schedule a meeting with the user upon receipt of the gift package. In some embodiments, step 1410 includes scheduling a delivery of the package based on a scheduled agenda between the user and the recipient. In some embodiments, the package includes a digital offer, and step 1410 includes setting a user-selected expiration date to the digital offer. In some embodiments, step 1410 includes providing an interactive element in a third party application running in a user client device to link the user to the server for preparing the package. In some embodiments, step 1410 includes confirming a recipient's address prior to sending the gift package. For example, in some embodiments, step 1410 includes sending an electronic message to the recipient to confirm a physical mailing address before delivering the package. In some embodiments, step 1410 may include configuring a variable expiration date for the gift package.

Figure 15:
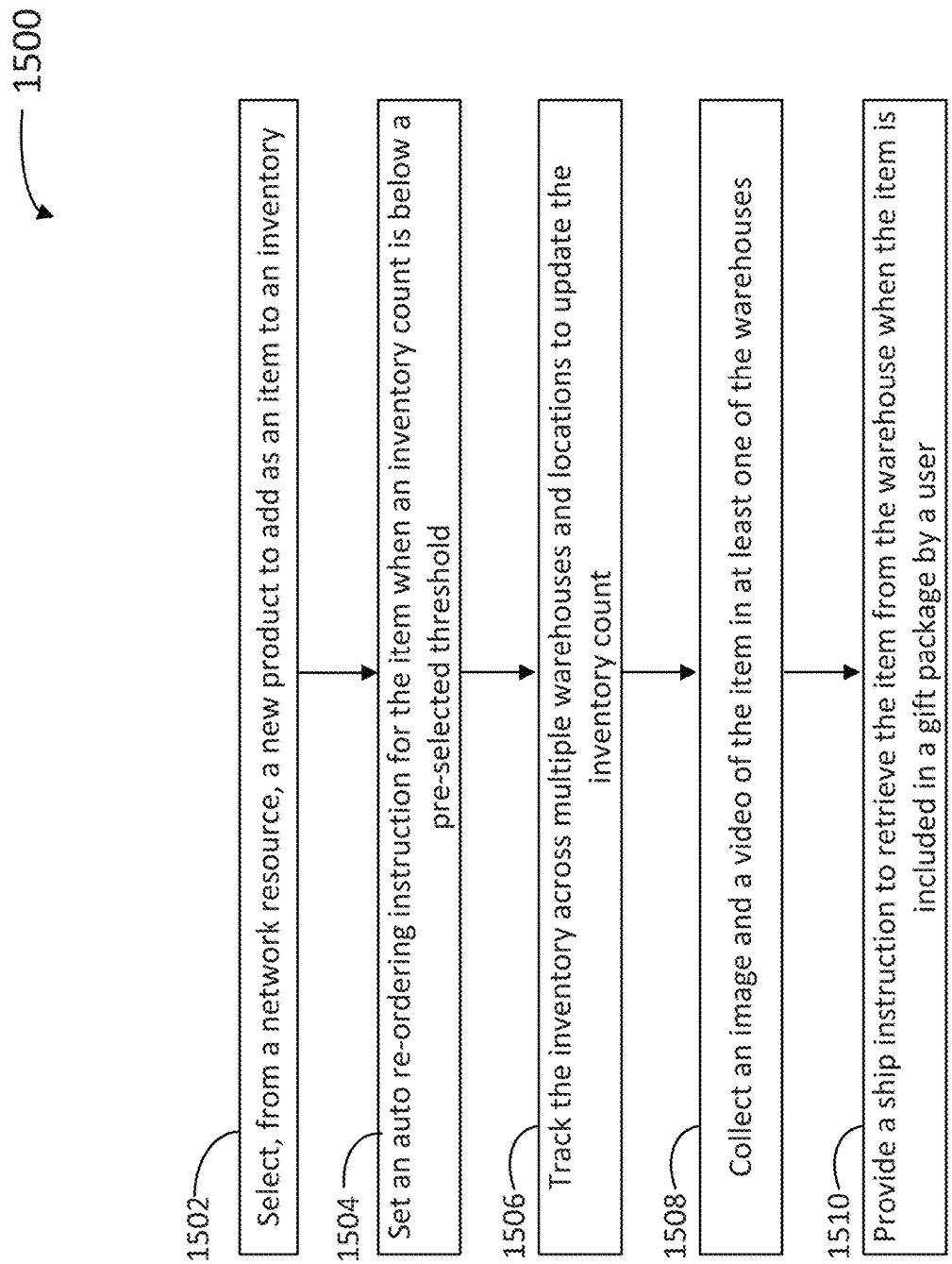
FIG. 15 is a flowchart illustrating steps in a method for managing a client relations network, according to some embodiments.

FIG. 15 is a flowchart illustrating steps in a method 1500 for managing a client relations network, according to some embodiments. Method 1500 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1500 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1500 may include retrieving, editing, and/or storing files in a database that is part of, or is communicably coupled to, the computer (e.g., database 252). Methods consistent with the present disclosure may include at least some, but not all, of the steps illustrated in method 1500, performed in a different sequence. Furthermore, methods consistent with the present disclosure may include at least two or more steps as in method 1500 performed overlapping in time, or almost simultaneously.

Step 1502 includes selecting, from a network resource, a new product to add as an item to an inventory.

Step 1504 includes setting an auto re-ordering instruction for the item when an inventory count is below a pre-selected threshold.

Step 1506 includes tracking the inventory across multiple warehouses and locations to update the inventory count.

Step 1508 includes collecting an image and a video of the item in at least one of the warehouses.

Step 1510 includes providing a ship instruction to retrieve the item from the warehouse when the item is included in a gift package by a user. In some embodiments, step 1510 includes confirming a mailing address for the gift recipient before a package is sent. In some embodiments, step 1510 includes generating the recipient's address link, and copying/pasting the link into the users email outbox. In some embodiments, step 1510 includes triggering an address configuration tool via integration with a third party service. In some embodiments, step 1510 may include providing a prompt to the gift recipient that "if you don't want it, we will send the gift package to a selected Colleague_Name." In some embodiments, step 1510 may include providing a prompt to the gift recipient as a social proof, such as "we also sent to "Colleague_Name" who redelivered to WFH address." For example, in some embodiments, step 1510 includes providing a social proof message to the gift recipient, such as "you share 28 connections on LinkedIn with the Sender." Step 1510 may include sending the social proof message via a short message service (SMS) text. In some embodiments, step 1510 may include adding a checkbox in a message to keep the recipient's address on file for a pre-selected amount of time (weeks, months, and the like). In some embodiments, step 1510 includes prompting the recipient for an alternative address to send the gift (Nearby Me, e.g., to avoid privacy breaches). In some embodiments, step 1510 may include adding a printed postcard to the gift package with a request that an office manager will take a picture of a postcard and forward to recipient when the recipient is unable to receive the gift package at a corporate address (e.g., the recipient works remotely or is not currently at the office). In some embodiments, step 1510 includes redelivering the gift package from office to home address via an offline/online process.

Figure 16:
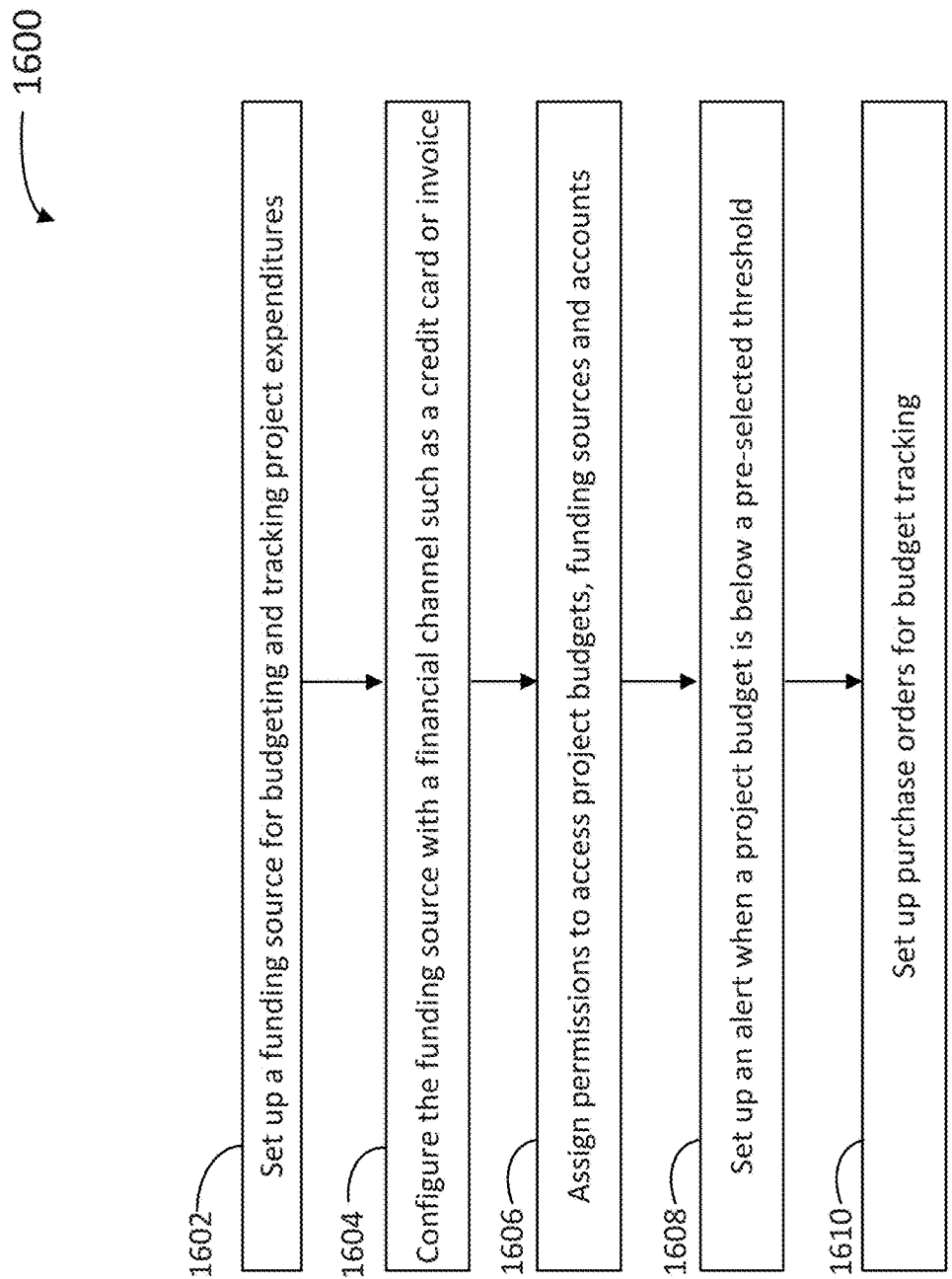
FIG. 16 is a flowchart illustrating steps in a method for providing account balances in a client relations management engine, according to some embodiments.

FIG. 16 is a flowchart illustrating steps in a method 1600 for providing account balances in a client relations management engine, according to some embodiments. Method 1600 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1600 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1600 may include retrieving, editing, and/or storing files in a database that is part of, or is communicably coupled to, the computer (e.g., database 252). Methods consistent with the present disclosure may include at least some, but not all, of the steps illustrated in method 1600, performed in a different sequence. Furthermore, methods consistent with the present disclosure may include at least two or more steps as in method 1600 performed overlapping in time, or almost simultaneously.

Step 1602 includes setting up a funding source for budgeting and tracking project expenditures.

Step 1604 includes configuring the funding source with a financial channel such as a credit card or an invoice.

Step 1606 includes assigning permissions to access project budgets, funding sources and accounts. In some embodiments, step 1606 include assigning budgets for users based on a user role within an organization, or the intended recipient's role, and their respective organizations.

Step 1608 includes setting up an alert when a project budget is below a pre-selected threshold.

Step 1610 includes setting up purchase orders for budget tracking.

Figure 17:
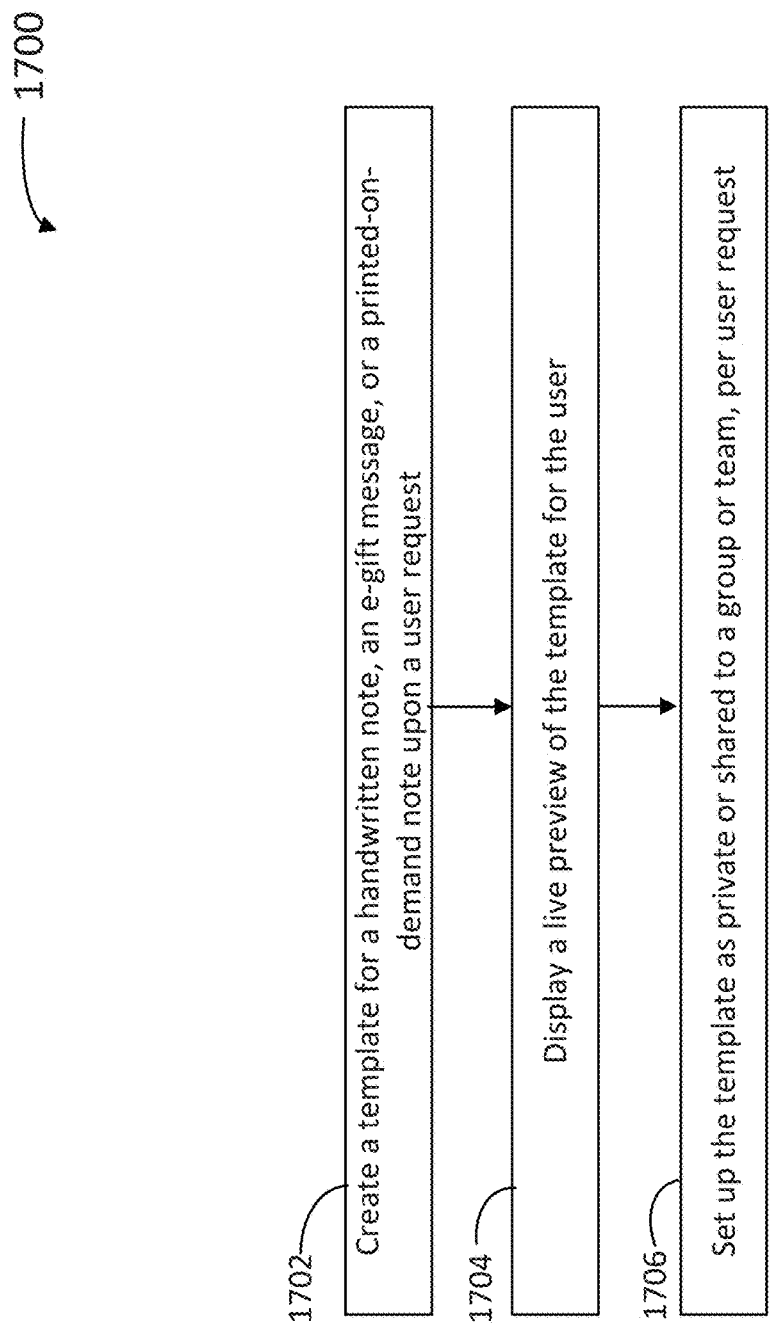
FIG. 17 is a flowchart illustrating steps in a method for managing templates in a client relations network, according to some embodiments.

FIG. 17 is a flowchart illustrating steps in a method 1700 for managing templates in a client relations network, according to some embodiments. Method 1700 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1700 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1700 may include retrieving, editing, and/or storing files in a database that is part of, or is communicably coupled to, the computer (e.g., database 252). Methods consistent with the present disclosure may include at least some, but not all, of the steps illustrated in method 1700, performed in a different sequence. Furthermore, methods consistent with the present disclosure may include at least two or more steps as in method 1700 performed overlapping in time, or almost simultaneously.

Step 1702 includes creating a template for a handwritten note, an e-gift message, or a printed-on-demand note upon a user request. In some embodiments, the CRM engine may include a robot for "hand" writing. Accordingly, step 1702 may include automatically suggesting the content for handwritten notes using artificial intelligence algorithms. The artificial intelligence algorithm may base the suggestions on past user engagement data to assess preferred ROI on which handwritten language had better outcomes for one customer versus another. In some embodiments, step 1702 may include recommending different types of language based on past data. In some embodiments, step 1702 may include modifying the language of the note based on interactions between the sender and recipient (e.g., phone call interaction/transcription). In some embodiments, step 1702 may optionally include a reference to the interaction itself (e.g., "I remember you mentioned in our call that . . . "). In some embodiments, step 1702 may include adjusting the formality of the language up or down, based on past indications of what the recipient (or someone in the same or similar role or at the same company) has had a positive reaction from the recipient. In some embodiments, step 1702 includes indicating for the user what to avoid in a message to make their note more unique from similar notes from other senders in the same or similar role, or notes from the same sender in the past. For example, in some embodiments, step 1702 may include inspecting the language of the note to eliminate or avoid the use of questionable content that is identified (e.g., profanity, inappropriate relationship, and the like).

Step 1704 includes displaying a live preview of the template for the user.

Step 1706 includes setting up the template as private or shared with a group or team, per user request.

Figure 18:
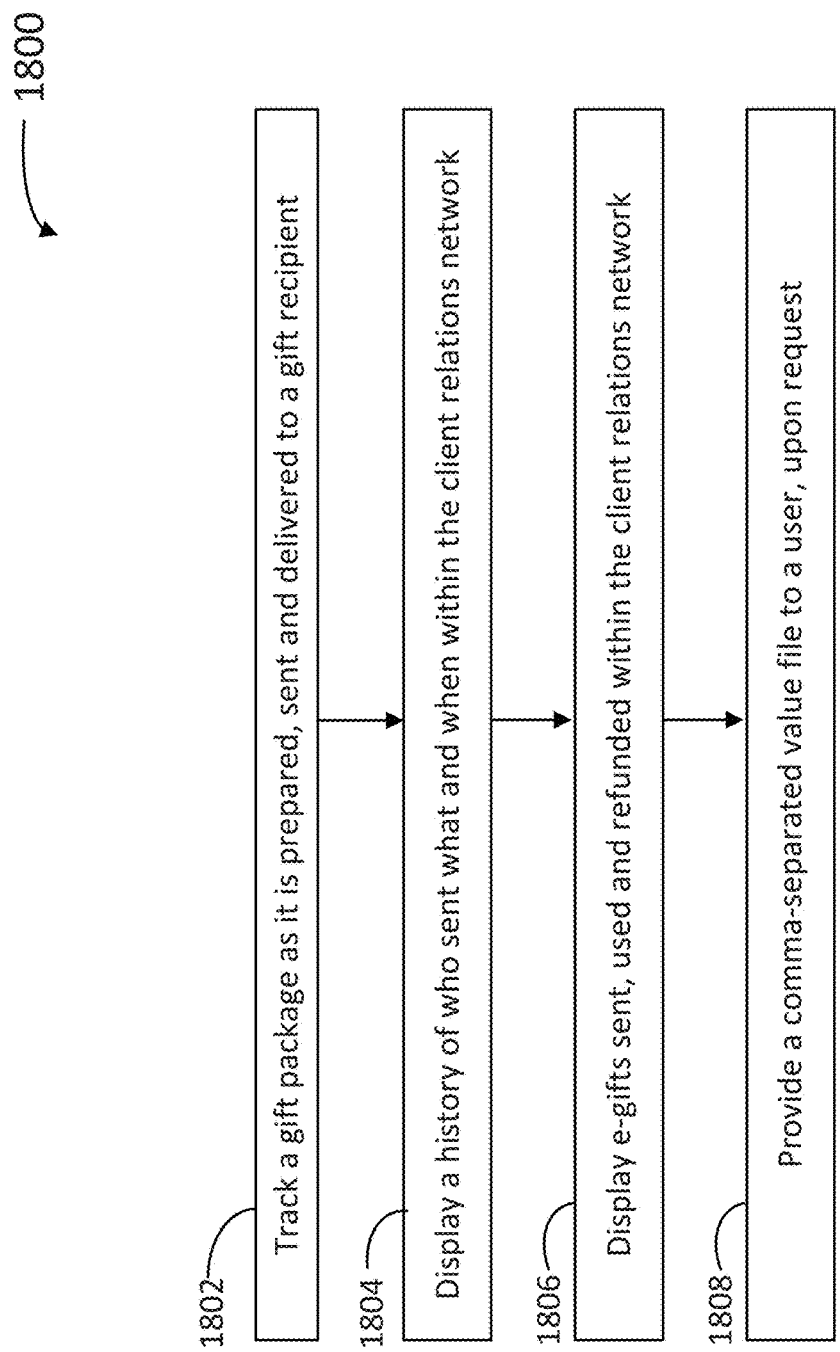
FIG. 18 is a flowchart illustrating steps in a method for tracking a gift package in a client relations network, according to some embodiments.

FIG. 18 is a flowchart illustrating steps in a method 1800 for tracking a gift package in a client relations network, according to some embodiments. Method 1800 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1800 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1800 may include retrieving, editing, and/or storing files in a database that is part of, or is communicably coupled to, the computer (e.g., database 252). Methods consistent with the present disclosure may include at least some, but not all, of the steps illustrated in method 1800, performed in a different sequence. Furthermore, methods consistent with the present disclosure may include at least two or more steps as in method 1800 performed overlapping in time, or almost simultaneously.

Step 1802 includes tracking a gift package as it is prepared, sent and delivered to a gift recipient.

Step 1804 includes displaying a history of who sent what and when within the client relations network.

Step 1806 includes displaying e-gifts sent, used and refunded within the client relations network.

Step 1808 includes providing a comma-separated value (CSV) file to a user, upon request. In some embodiments, the CSV file includes a list with at least a partial history of who sent what and when.

Figure 19:
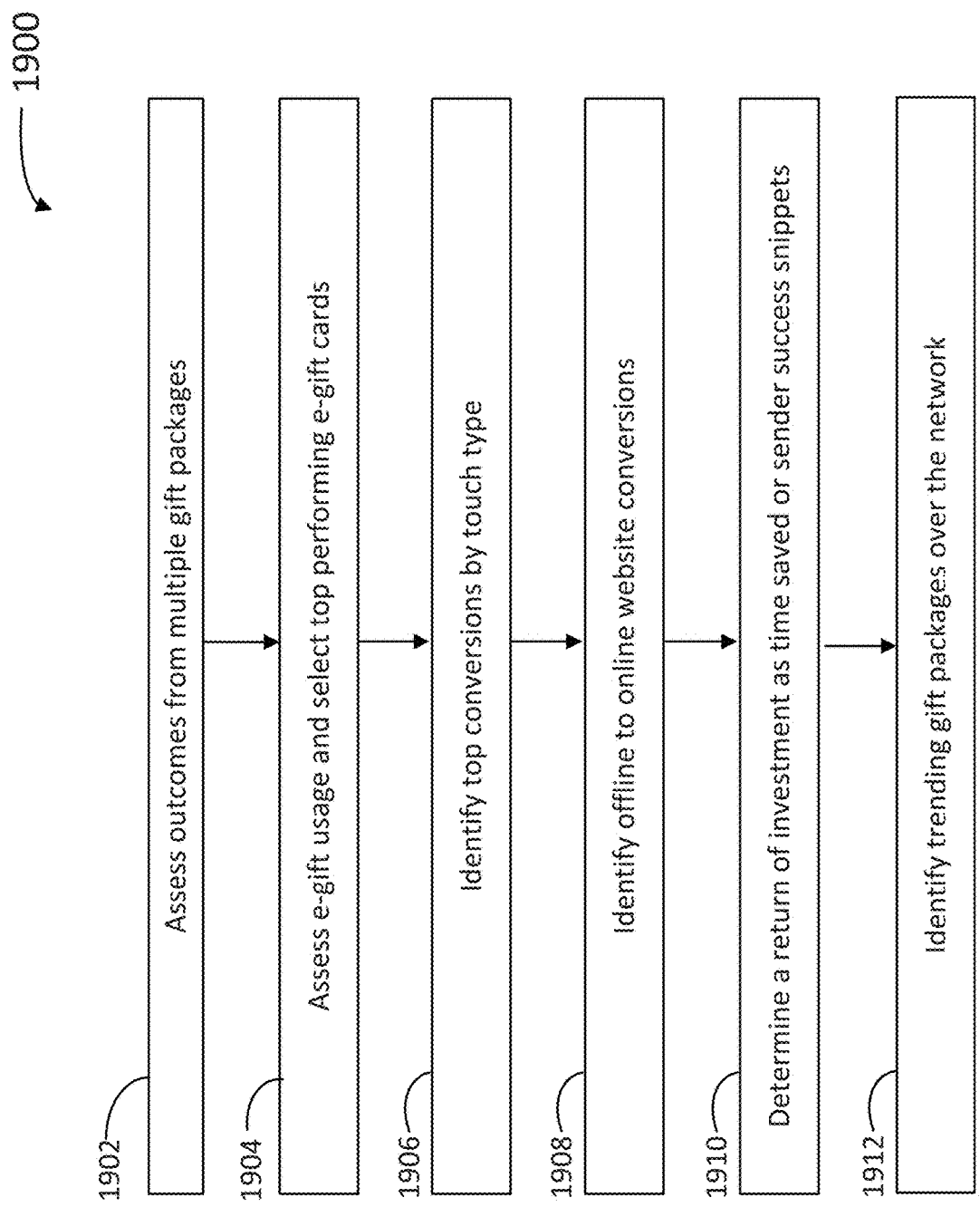
FIG. 19 is a flowchart illustrating steps in a method for performing analytics in a client relations management engine, according to some embodiments.

FIG. 19 is a flowchart illustrating steps in a method 1900 for performing analytics in a client relations management engine, according to some embodiments. Method 1900 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 1900 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 1900 may include retrieving, editing, and/or storing files in a database that is part of, or is communicably coupled to, the computer (e.g., database 252). Methods consistent with the present disclosure may include at least some, but not all, of the steps illustrated in method 1900, performed in a different sequence. Furthermore, methods consistent with the present disclosure may include at least two or more steps as in method 1900 performed overlapping in time, or almost simultaneously.

Step 1902 includes assessing outcomes from multiple gift packages.

Step 1904 includes assessing e-gift usage and selecting top performing e-gift cards.

Step 1906 includes identifying top conversions by touch type. In some embodiments, step 1906 includes providing to the recipient a gift card for selecting gifts of a first value among various gifts presented on a third party platform. When the recipient prefers not to select a gift on the platform, step 1906 may include allowing the recipient to use the gift card at another retailer but with a different budget.

Step 1908 includes identifying offline to online website conversions. In some embodiments, step 1908 includes tracking when a gift recipient visits the user website (online) after a gift package has been delivered (offline). In some embodiments, step 1908 includes identifying when there is a web visit on the user's company website from the recipient company on the same day a gift package has been delivered, or shortly thereafter (within a certain period of time of the package being recorded as delivered). In some embodiments, step 1908 may include retrieving or collecting internet protocol (IP) address data from the recipient and identifying a recipient visit to the user's company website via the IP address data. In some embodiments, step 1908 may include verifying a gift package delivery date, and a website visit date/time. In some embodiments, the user's company website may have an embedded code from the CRM engine to track visitors. The code uses a third party database that associates IP addresses with company data sets. In order to assess whether the visit to the user's company website is likely the recipient, the CRM engine can provide a confidence factor integrating past behavior of visits from the recipient enterprise to the user's company website.

Step 1910 includes determining a return of investment (ROI) as time saved or sender success snippets (online visits to sender website by gift recipient after gift package delivery or notification).

Step 1912 includes identifying trending gift packages over the client relations network.

Figure 20:
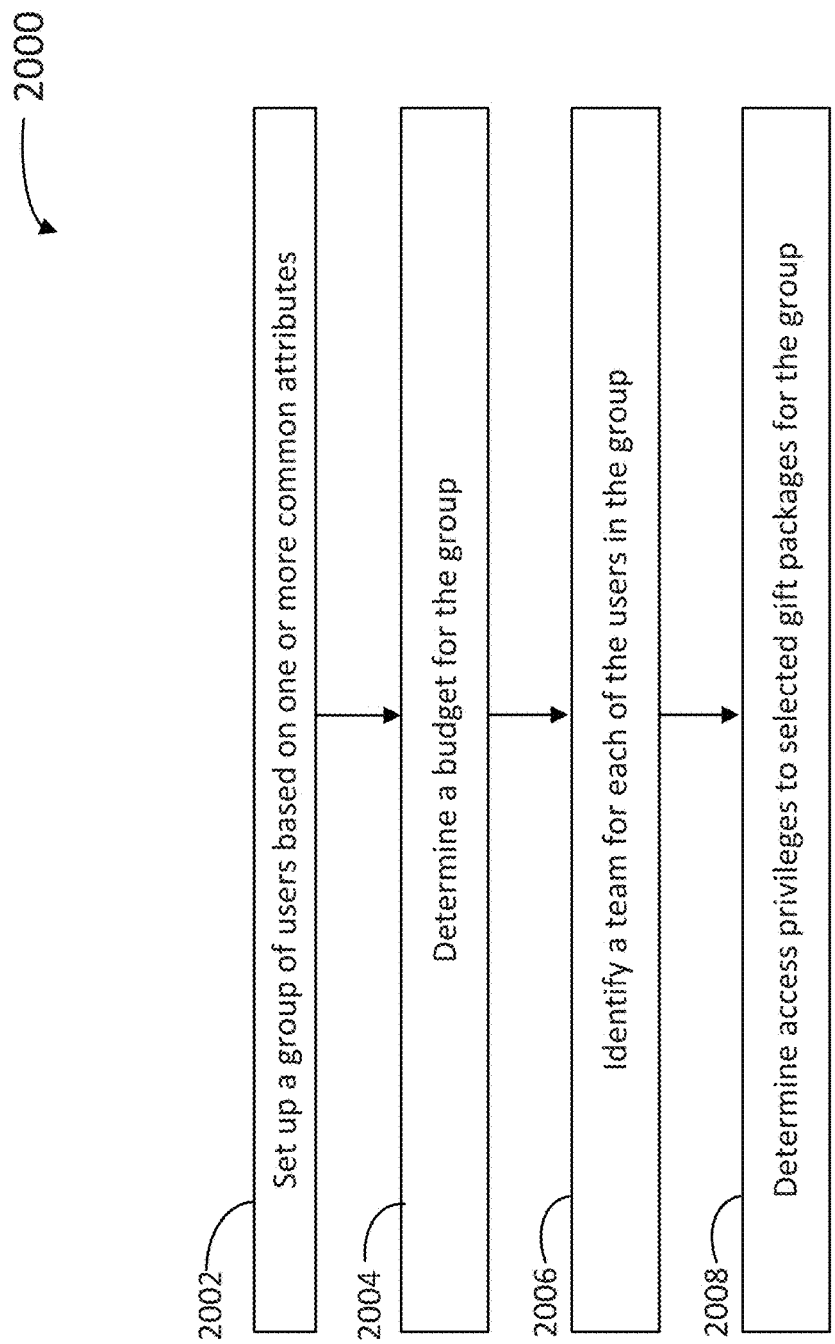
FIG. 20 is a flowchart illustrating steps in a method for creating teams in a client relations network, according to some embodiments.

FIG. 20 is a flowchart illustrating steps in a method 2000 for creating teams in a client relations network, according to some embodiments. Method 2000 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 2000 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 2000 may include retrieving, editing, and/or storing files in a database that is part of, or is communicably coupled to, the computer (e.g., database 252). Methods consistent with the present disclosure may include at least some, but not all, of the steps illustrated in method 2000, performed in a different sequence. Furthermore, methods consistent with the present disclosure may include at least two or more steps as in method 2000 performed overlapping in time, or almost simultaneously.

Step 2002 includes setting up a group of users based on one or more common attributes.

Step 2004 includes determining a budget for the group of users.

Step 2006 includes identifying a team for each of the users in the group.

Step 2008 includes determining access privileges to selected gift packages and 'touches' for the group.

Figure 21:
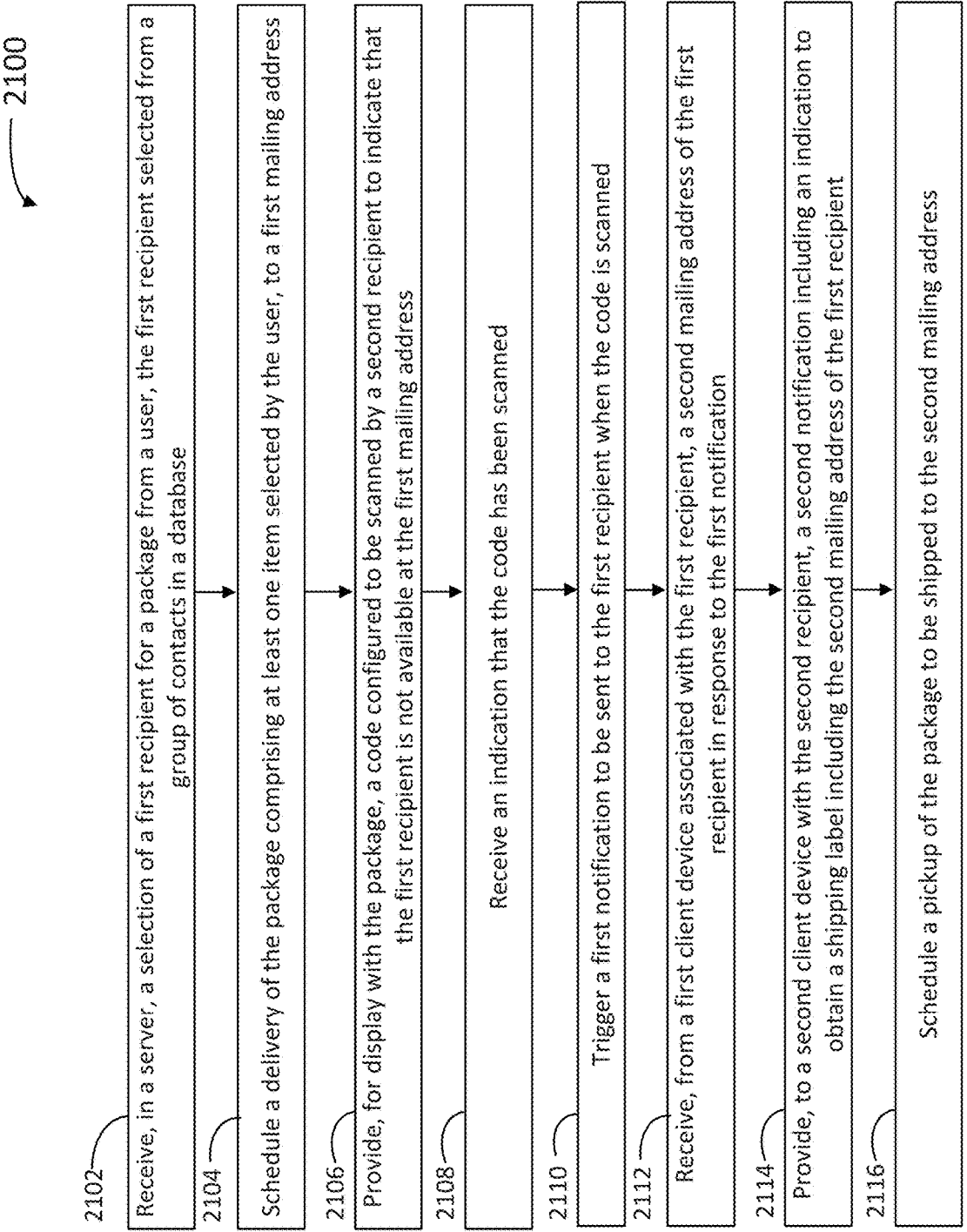
FIG. 21 is a flowchart illustrating steps in a method for selecting and providing a gift package to identified current and potential business contacts, according to some embodiments.

FIG. 21 is a flowchart illustrating steps in a method 2100 for selecting and providing a gift package to identified current and potential business contacts, according to some embodiments. Method 2100 may be performed at least partially by any one of the network servers hosting a CRM engine for users of client devices communicatively coupled with the network server through a network, using a communication module (e.g., server 130, CRM engine 232, client devices 110, network 150, and communication modules 218). The CRM engine may include a rules tool, an inventory tool, a networking tool, a logistics tool, a package preparation tool, a package delivery tool, and a scheduling tool (e.g., rules tool 240, inventory tool 272, networking tool 242, logistics tool 244, package preparation tool 246, package delivery tool 248, and scheduling tool 250), as disclosed herein. The different tools in the CRM engine may be arranged in different systems such as an order management system, and a warehouse management system including the inventory tool (e.g., order management system 260 and warehouse management system 270). At least some of the steps in method 2100 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 2100 may include retrieving, editing, and/or storing files in a database that is part of, or is communicably coupled to, the computer (e.g., database 252). Methods consistent with the present disclosure may include at least some, but not all, of the steps illustrated in method 2100, performed in a different sequence. Furthermore, methods consistent with the present disclosure may include at least two or more steps as in method 2100 performed overlapping in time, or almost simultaneously.

Step 2102 includes receiving, in a server, a selection of a first recipient for a package from a user, the first recipient selected from a group of contacts in a database. In some embodiments, the group of contacts forms a client network associated with the user, and step 2102 includes receiving a request from the user to send the package to at least one contact in the group of contacts and selecting the first recipient based on the at least one contact. In some embodiments, step 2102 includes verifying a return of investment for the user based on a prior history of presents with the group of contacts. In some embodiments, step 2102 includes providing a text message to include as a note in the package, the text message having a semantic content based on a digital attribute of the first recipient and a digital attribute of the user. In some embodiments, step 2102 includes verifying a cap value for a list of items to include in the package based on a digital attribute of the first recipient and a digital attribute of the user. In some embodiments, step 2102 includes tracking an interest of the first recipient for an item to be included in the package based on a publicly available record of a network account associated with the first recipient.

Step 2104 includes scheduling a delivery of the package including at least one item selected by the user, to a first mailing address. In some embodiments, step 2104 includes providing an interactive element in a third party application running in a user client device to link the user to the server for preparing the package.

Step 2106 includes providing, for display with the package, a code configured to be scanned by a second recipient to indicate that the first recipient is not available at the first mailing address.

Step 2108 includes receiving an indication that the code has been scanned.

Step 2110 includes triggering a first notification to be sent to the first recipient when the code is scanned. In some embodiments, step 2110 includes adding, in the first notification, a link to a web page configured to receive the second mailing address from the first recipient.

Step 2112 includes receiving, from a first client device associated with the first recipient, a second mailing address of the first recipient in response to the first notification.

Step 2114 includes providing, to a second client device with the second recipient, a second notification including an indication to obtain a shipping label including the second mailing address of the first recipient. In some embodiments, the second notification triggers a printing, on a printing device coupled to the second client device, of a new shipping label with the second mailing address of the first recipient.

Step 2116 includes scheduling a pickup of the package to be shipped to the second mailing address. In some embodiments, step 2116 includes receiving, from the second recipient, a confirmation that a new shipping label with the second mailing address of the first recipient is on the package.

Hardware Overview

Figure 22:
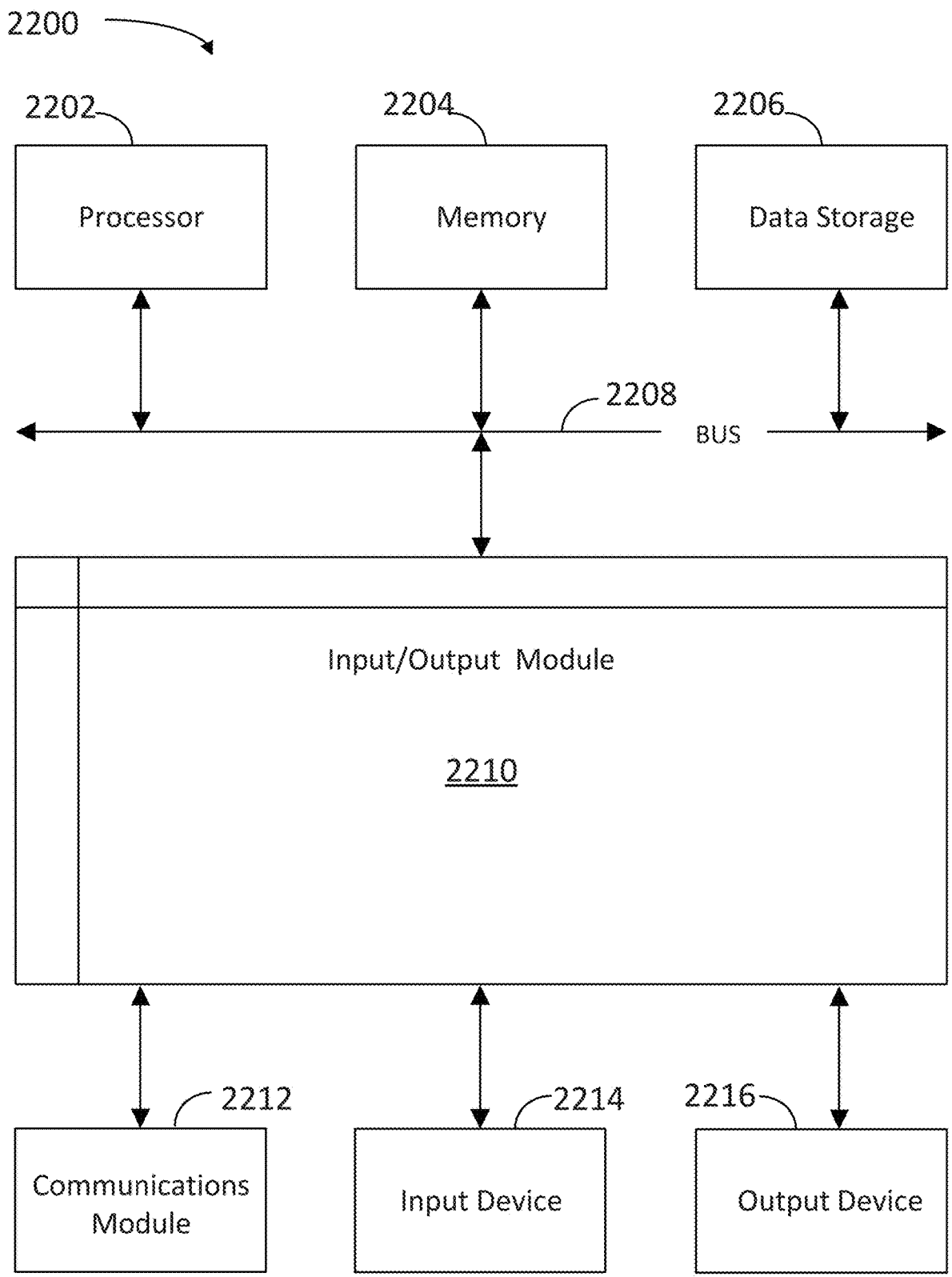
FIG. 22 is a block diagram illustrating an example computer system with which the client and server of FIGS. 1 and 2, and the methods of FIGS. 14 through 21 can be implemented, according to some embodiments.

FIG. 22 is a block diagram illustrating an exemplary computer system 2200 with which the client device 110 and server 130 of FIGS. 1-2, and the methods of FIGS. 13 through 19 can be implemented. In certain aspects, the computer system 2200 may be implemented using hardware or a combination of software and hardware, either in a dedicated server, or integrated into another entity, or distributed across multiple entities.

Computer system 2200 (e.g., client device 110 and server 130) includes a bus 2208 or other communication mechanism for communicating information, and a processor 2202 (e.g., processors 212) coupled with bus 2208 for processing information. By way of example, the computer system 2200 may be implemented with one or more processors 2202. Processor 2202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 2200 can include, in addition to hardware, a code that creates an execution environment for the computer program in question, e.g., code that constitutes processor firmware, a protocol stack, a database management system, an operating system, or a combination of one or more of them stored in an included memory 2204 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 2208 for storing information and instructions to be executed by processor 2202. The processor 2202 and the memory 2204 can be supplemented by, or incorporated in, a special purpose logic circuitry.

The instructions may be stored in the memory 2204 and implemented in one or more computer program products, i.e., one or more modules of computer program instructions encoded on a computer-readable medium for execution by, or to control the operation of, the computer system 2200, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 2204 may also be used for storing temporary variable or other intermediate information during execution of instructions to be executed by processor 2202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 2200 further includes a data storage device 2206 such as a magnetic disk or optical disk, coupled to bus 2208 for storing information and instructions. Computer system 2200 may be coupled via input/output module 2210 to various devices. Input/output module 2210 can be any input/output module. Exemplary input/output modules 2210 include data ports such as USB ports. The input/output module 2210 is configured to connect to a communications module 2212. Exemplary communications modules 2212 (e.g., communications modules 218) include networking interface cards, such as Ethernet cards and modems. In certain aspects, input/output module 2210 is configured to connect to a plurality of devices, such as an input device 2214 (e.g., input device 214) and/or an output device 2216 (e.g., output device 216). Exemplary input devices 2214 include a keyboard and a pointing device, e.g., a mouse or a trackball, by which a user can provide input to the computer system 2200. Other kinds of input devices 2214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 2216 include display devices, such as an LCD (liquid crystal display) monitor, for displaying information to the user.

According to one aspect of the present disclosure, the client device 110 and server 130 can be implemented using a computer system 2200 in response to processor 2202 executing one or more sequences of one or more instructions contained in memory 2204. Such instructions may be read into memory 2204 from another machine-readable medium, such as data storage device 2206. Execution of the sequences of instructions contained in main memory 2204 causes processor 2202 to perform the process steps described herein. One or more processors in a multi-processing arrangement may also be employed to execute the sequences of instructions contained in memory 2204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 2200 can include clients and servers. A client and server are generally remote from each other and typically interact through a communication network. The relationship of client and server arises by virtue of computer programs running on the respective computers and having a client-server relationship with each other. Computer system 2200 can be, for example, and without limitation, a desktop computer, laptop computer, or tablet computer. Computer system 2200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 2202 for execution. Such a medium may take many forms, including, but not limited to, non-volatile media, volatile media, and transmission media. Non-volatile media include, for example, optical or magnetic disks, such as data storage device 2206. Volatile media include dynamic memory, such as memory 2204. Transmission media include coaxial cables, copper wire, and fiber optics, including the wires that include bus 2208. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   selecting, in a server associated with a client relations management (CRM) platform, a group of users in a social network based on one or more common attributes of the group of users, wherein the group of users forms a client network associated with a user of the CRM platform;
   determining, in the server, a budget for the group of users based on a role of each user of the group of users within an organization associated with the social network and based on a contact list of each user of the group of users, stored in a database;
   determining access privileges to selected gift packages for the group of users based on the budget;
   determining, based on the access privileges, a plurality of gift packages for the group of users;
   generating, based on the access privileges, an interactive element in a graphical user interface of a client device associated with each user of the group of users, the interactive element displayed in real time in a virtual conference of a third-party virtual conferencing application hosted by the client device;
   receiving, by the interactive element, a selection of a gift package of the plurality of gift packages from at least one user of the group of users;
   determining, based on the selection, at least one winning gift package from the plurality of gift packages; and
   sending, during the virtual conference, the at least one winning gift package to the group of users.

2. The computer-implemented method of claim 1, further comprising assessing outcomes from the at least one winning gift package sent to the group of users.

3. The computer-implemented method of claim 1, further comprising assessing an e-gift usage and selecting a top performing e-card.

4. The computer-implemented method of claim 1, further comprising identifying a top conversion by touch type.

5. The computer-implemented method of claim 1, further comprising identifying offline to online website conversions.

6. The computer-implemented method of claim 1, further comprising determining a return of investment as time saved or sender success snippets.

7. The computer-implemented method of claim 1, further comprising identifying trending gift packages over the social network.

8. The computer-implemented method of claim 1, further comprising tracking the at least one winning gift package as it is prepared, sent and delivered to a member of the group of users.

9. The computer-implemented method of claim 1, further comprising displaying a history of a sender and an item sent and storing a client relations network in the database.

10. The computer-implemented method of claim 1, further comprising providing a comma-separated value file to the user of the CRM platform, the comma-separated value file including an account budget for the group of users.

11. A system, comprising:
one or more processors; and
a memory storing instructions which, when executed by the processors, cause the system to:
select, in a server associated with a client relations management (CRM) platform, a group of users in a social network based on one or more common attributes of the group of users, wherein the group of users forms a client network associated with a user of the CRM platform;
determine, in the server, a budget for the group of users based on a role of each user of the group of users within an organization associated with the social network and based on a contact list of each user of the group of users, stored in a database;
determine access privileges to selected gift packages for the group of users based on the budget;
determine, based on the access privileges, a plurality of gift packages for the group of users;
generate, based on the access privileges, an interactive element in a graphical user interface of a client device associated with each user of the group of users, the interactive element displayed in real time in a virtual conference of a third-party virtual conferencing application hosted by the client device;
receive, by the interactive element, a selection of a gift package of the plurality of gift packages from at least one user of the group of users;
determine, based on the selection, at least one winning gift package from the plurality of gift packages;
send, during the virtual conference, the at least one winning gift package to the group of users; and
assess an outcome from the at least one winning gift package sent to the group of users.

12. The system of claim 11, wherein the one or more processors further execute instructions to assess an e-gift usage and selecting a top performing e-card.

13. The system of claim 11, wherein the one or more processors further execute instructions to identify a top conversion by touch type.

14. The system of claim 11, wherein the one or more processors further execute instructions to identify offline to online website conversions.

15. The system of claim 11, wherein the one or more processors further execute instructions to determine a return of investment as time saved or sender success snippets.

16. A non-transitory, computer-readable medium storing instructions which, when executed by a processor in a computer, cause the computer to perform a method, the method comprising:
selecting, in a server associated with a client relations management (CRM) platform, a group of users in a social network based on one or more common attributes of the group of users, wherein the group of users forms a client network associated with a user of the CRM platform;
determining, in the server, a budget for the group of users based on a role of each user of the group of users within an organization associated with the social network and based on a contact list of each user of the group of users, stored in a database;
determining access privileges to selected gift packages for the group of users based on the budget;
determining, based on the access privileges, a plurality of gift packages for the group of users;
generating, based on the access privileges, an interactive element in a graphical user interface of a client device associated with each user of the group of users, the interactive element displayed in real time in a virtual conference of a third-party virtual conferencing application hosted by the client device;
receiving, by the interactive element, a selection of a gift package of the plurality of gift packages from at least one user of the group of users;
determining, based on the selection, at least one winning gift package from the plurality of gift packages;
sending, during the virtual conference, the at least one winning gift package to the group of users; and
assessing outcomes from the at least one winning gift package sent to the group of users.

17. The non-transitory, computer-readable medium of claim 16, wherein the method further comprises identifying a top conversion by touch type.

18. The non-transitory, computer-readable medium of claim 16, wherein the method further comprises identifying offline to online website conversions.

19. The non-transitory, computer-readable medium of claim 16, wherein the method further comprises determining a return of investment as time saved or sender success snippets.

20. The non-transitory, computer-readable medium of claim 16, wherein the method further comprises identifying trending gift packages over the social network.

* * * * *